(12) United States Patent
Coffey

(10) Patent No.: US 12,161,204 B1
(45) Date of Patent: Dec. 10, 2024

(54) CASE FOR ID CARDS AND SECURITY TOKEN

(71) Applicant: Robert Coffey, Stuttgart (DE)

(72) Inventor: Robert Coffey, Stuttgart (DE)

(*) Notice: Subject to any disclaimer, the term of this patent is extended or adjusted under 35 U.S.C. 154(b) by 248 days.

(21) Appl. No.: 17/578,141

(22) Filed: Jan. 18, 2022

Related U.S. Application Data

(60) Provisional application No. 63/138,622, filed on Jan. 18, 2021.

(51) Int. Cl.
*A45C 11/18* (2006.01)
*G06F 21/34* (2013.01)

(52) U.S. Cl.
CPC ............ *A45C 11/182* (2013.01); *G06F 21/34* (2013.01)

(58) Field of Classification Search
CPC ............................. A45C 11/182; G06F 21/34
USPC .................................................. 150/147, 137
See application file for complete search history.

(56) References Cited

U.S. PATENT DOCUMENTS 10,016,037 B2 * 7/2018 Broly .................... A45C 11/182

OTHER PUBLICATIONS

Pilch:https://www.etsy.com/listing/1001767007/3d-printed-folding-rsa-badge-holder (Year: 2018).*
IDBLADE: https://www.etsy.com/listing/915331506/carbon-fiber-triple-id-badge-rsa-token?click_key=ede5fd017ec3d265d684acb07d22f94ab6054a08%3A915331506&click_sum=1d2bb717&ref=landingpage_similar_listing_bot-2&pro=1&sts=1&listing_id=915331506&listing_slug=carbon-fiber-triple-id-badge-rsa-token (Year: 2020).*

* cited by examiner

*Primary Examiner* — Don M Anderson
*Assistant Examiner* — Jessica Kavini Tamil
(74) *Attorney, Agent, or Firm* — Tillman, Wright & Wolgin; James D. Wright; David R. Higgins

(57) ABSTRACT

A case for holding one or more identification cards and a security token is configured to enable installation of a reversible cover in a primary housing in both a card display state in which a first depthwise side of the reversible cover is aligned with a first depthwise side of the primary housing such that an identification card installed in the primary housing is visible from an exterior of the case, and a card conceal state in which a second depthwise side of the reversible cover is aligned with the first depthwise side of the primary housing such that an identification card installed in the primary housing is not visible from an exterior of the case. The case is further configured to enable installation of a security token within the primary housing.

18 Claims, 34 Drawing Sheets

CASE FOR ID CARDS AND SECURITY TOKEN

CROSS-REFERENCE TO RELATED APPLICATION

The present application is a U.S. nonprovisional patent application of, and claims priority under 35 U.S.C. § 119 (e) to, U.S. provisional patent application Ser. No. 63/138,622, filed Jan. 18, 2021 and entitled "CASE FOR ID CARDS AND SECURITY TOKEN," which provisional patent application is incorporated by reference herein.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE PRESENT INVENTION

Field of the Present Invention

The present invention relates generally to storage and display of identification cards, badges, and security tokens.

Background

Identification cards (ID cards), security badges, and similar security or identity tokens are increasingly ubiquitous. Traditionally, many individuals who need to frequently provide or display an ID card or security badge will wear a lanyard secured to an ID card or security badge, or secured to a transparent sleeve containing an ID card or security badge, or will clip such an ID card or security badge, or a transparent sleeve containing an ID card or security badge, to a shirt or other garment.

Electronic security tokens are another widely used security mechanism, which frequently take the form of key fobs that a user can secure to their key ring. These key fobs generally contain electronic components that are configured to enable access to a system or location. For example, a key fob may be an ID fob configured for electronic communication with a reader to identify a holder, or may include a display screen and be configured to display a secure code on demand that a holder can utilize to access a secured door or secured computer system. This key fob may be utilized as part of a two-factor authentication mechanism. One very common key fob is an RSA SecurID key fob offered by RSA, which is a subsidiary of Dell Technologies. These key fobs are commonly attached by users to a key ring.

Some have attempted to create cases or other mechanisms for displaying an ID card and storing a security token. However, these cases and the like tend to be adapted to either display the ID card or to hide the ID card, rather than both, or tend to be adapted to either display the security token or to hide the security token, rather than both, and these cases tend not to be adapted to handle both an ID card and a security token. Thus, a need exists for improvement in storage and display of identification cards, badges, and security tokens. This, and other needs, are addressed by one or more aspects of the invention.

SUMMARY OF THE INVENTION

The invention includes many aspects and features. Moreover, while many aspects and features relate to, and are described in, the context of operational security for ID cards and security tokens, the invention is not limited to use only in the context of operational security for ID cards and security tokens, as will become apparent from the following summaries and detailed descriptions of aspects, features, and one or more embodiments of the invention.

Accordingly, one aspect of the invention relates to a case for holding one or more identification cards and a security token, the case comprising: a primary housing comprising two opposed receiving channels disposed on a first depthwise side of the primary housing, the opposed receiving channels extending lengthwise along widthwise sides of the primary housing, each receiving channel extending along an interior of a respective widthwise side through a top of the primary housing such that a top opening of each receiving channel is defined in the top of the primary housing, a bottom of each receiving channel being flush with an interior surface of a bottom of the primary housing, a cutout opening sized and dimensioned for insertion of a security token, an inset frame protruding on a second depthwise side of the primary housing opposite the first depthwise side, the inset frame being sized and dimensioned to receive and hold a portion of a security token inserted through the cutout opening, the inset frame including a view cutout sized, dimensioned, and positioned to correspond to a display screen of a security token when such a security token is received in the inset frame; a reversible cover sized and dimensioned to be removably received within the primary housing with widthwise sides of the reversible cover received within the opposed receiving channels of the primary housing, the reversible cover comprising a first depthwise side including retention members configured to retain an installed identification card for display, and a second depthwise side opposite the first depthwise side; wherein the case is configured to enable installation of an identification card in the reversible cover on the first depthwise side with retention by the retention members, installation of the reversible cover in the primary housing in a card display state in which the first depthwise side of the reversible cover is aligned with the first depthwise side of the primary housing such that an identification card installed in the primary housing is visible from an exterior of the case, and a card conceal state in which the second depthwise side of the reversible cover is aligned with the first depthwise side of the primary housing such that an identification card installed in the primary housing is not visible from an exterior of the case, storage of a plurality of cards behind the reversible cover when the reversible cover is installed in the primary housing, installation of a security token within the primary housing in a screen display state in which a display screen of such installed security token is visible through the view cutout of the inset frame, and a screen conceal state in which a display screen of such installed security token is not visible through the view cutout of the inset frame. In a feature of this aspect, the inset frame is sized and dimensioned to receive and hold a portion of an RSA SecurID security token.

In a feature of this aspect, the reversible cover is removably installed in the primary housing.

In a feature of this aspect, the case includes a first identification card installed in the reversible cover.

In a feature of this aspect, the case includes a first identification card installed in the reversible cover, and wherein the reversible cover is installed in the primary housing in the card display state with the first depthwise side of the reversible cover aligned with the first depthwise side of the primary housing such that the first identification card installed in the primary housing is visible from an exterior of the case.

In a feature of this aspect, the case includes a first identification card installed in the reversible cover, and wherein the reversible cover is installed in the primary housing in the card conceal state such that the second depthwise side of the reversible cover is aligned with the first depthwise side of the primary housing such that the first identification card installed in the primary housing is not visible from an exterior of the case.

In a feature of this aspect, the case includes a first identification card installed in the reversible cover, and wherein the reversible cover is installed in the primary housing, and wherein an additional card is secured in the housing behind the reversible cover.

In a feature of this aspect, the case includes a first identification card installed in the reversible cover, and wherein the reversible cover is installed in the primary housing, and wherein two or more additional cards are secured in the housing behind the reversible cover.

In a feature of this aspect, the case comprises high-density polyethylene.

In a feature of this aspect, the case comprises polypropylene.

Another aspect relates to a method of manufacturing a case for holding one or more identification cards and a security token, the method comprising: injection molding a primary housing comprising two opposed receiving channels disposed on a first depthwise side of the primary housing, the opposed receiving channels extending lengthwise along widthwise sides of the primary housing, each receiving channel extending along an interior of a respective widthwise side through a top of the primary housing such that a top opening of each receiving channel is defined in the top of the primary housing, a bottom of each receiving channel being flush with an interior surface of a bottom of the primary housing, a cutout opening sized and dimensioned for insertion of a security token, an inset frame protruding on a second depthwise side of the primary housing opposite the first depthwise side, the inset frame being sized and dimensioned to receive and hold a portion of a security token inserted through the cutout opening, the inset frame including a view cutout sized, dimensioned, and positioned to correspond to a display screen of a security token when such a security token is received in the inset frame; injection molding a reversible cover sized and dimensioned to be removably received within the primary housing with widthwise sides of the reversible cover received within the opposed receiving channels of the primary housing, the reversible cover comprising a first depthwise side including retention members configured to retain an installed identification card for display, and a second depthwise side opposite the first depthwise side; wherein the case is configured to enable installation of an identification card in the reversible cover on the first depthwise side with retention by the retention members, installation of the reversible cover in the primary housing in a card display state in which the first depthwise side of the reversible cover is aligned with the first depthwise side of the primary housing such that an identification card installed in the primary housing is visible from an exterior of the case, and a card conceal state in which the second depthwise side of the reversible cover is aligned with the first depthwise side of the primary housing such that an identification card installed in the primary housing is not visible from an exterior of the case, storage of a plurality of cards behind the reversible cover when the reversible cover is installed in the primary housing, installation of a security token within the primary housing in a screen display state in which a display screen of such installed security token is visible through the view cutout of the inset frame, and a screen conceal state in which a display screen of such installed security token is not visible through the view cutout of the inset frame. In a feature of this aspect, the primary housing comprises high-density polyethylene.

In a feature of this aspect, the primary housing comprises polypropylene.

In a feature of this aspect, the primary housing comprises a plastic composite.

In a feature of this aspect, the primary housing comprises polycarbonate.

In a feature of this aspect, the primary housing comprises acrylic.

In a feature of this aspect, the reversible cover comprises high-density polyethylene.

In a feature of this aspect, the primary housing comprises polypropylene.

In a feature of this aspect, the primary housing comprises a plastic composite.

In a feature of this aspect, the primary housing comprises polycarbonate.

Another aspect relates to a case as disclosed.

Another aspect relates to a method of manufacturing a case as disclosed.

Another aspect relates to a method of using a case as disclosed.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
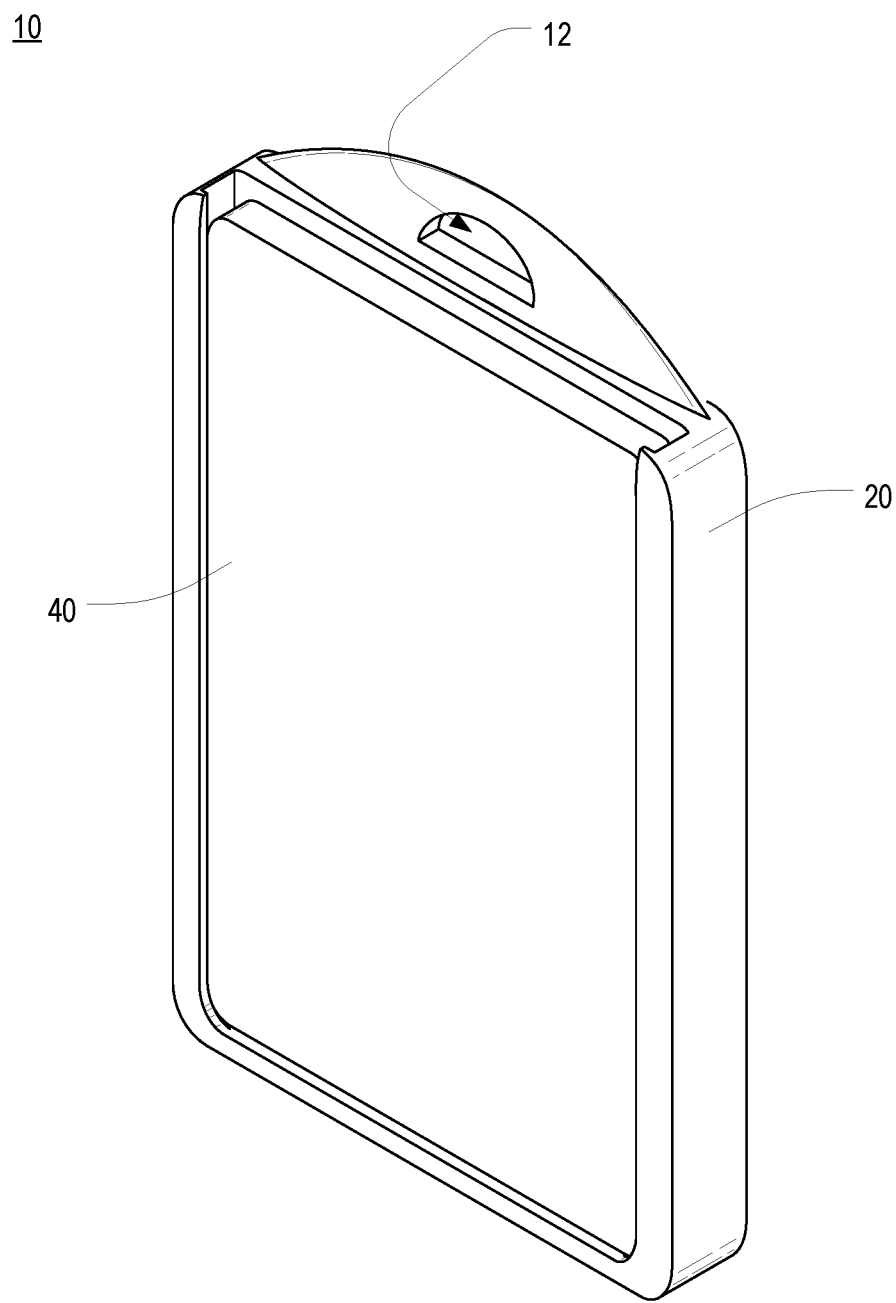
FIG. 1 is a front orthogonal view of a case for identification cards with a reversible cover in accordance with one or more preferred embodiments of the present invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112 (f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Figure 2:
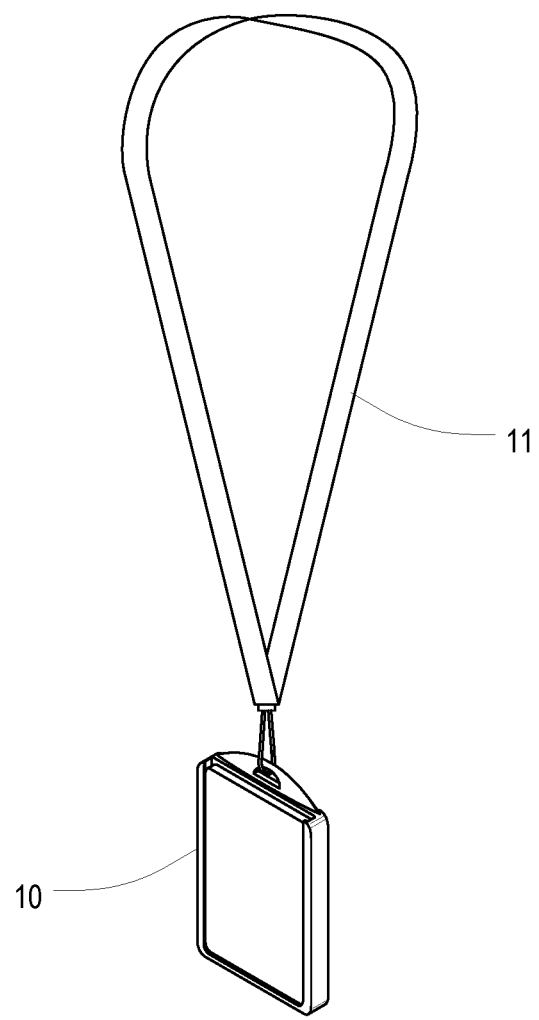
FIG. 2 is a front orthogonal view of the case of FIG. 1 carried on a lanyard.

FIG. 1 is a front orthogonal view of a case 10 for identification cards with a reversible cover 40 in accordance with one or more preferred embodiments of the present invention. The case 10 includes a primary housing 20 and a reversible cover 40. The primary housing 20 includes a securement opening 12 disposed near a top of the case 10 for use in securing the case 10 to a lanyard or clip. In this regard, FIG. 2 is a front orthogonal view of the case 10 of FIG. 1 carried on a lanyard 11.

Figure 3:
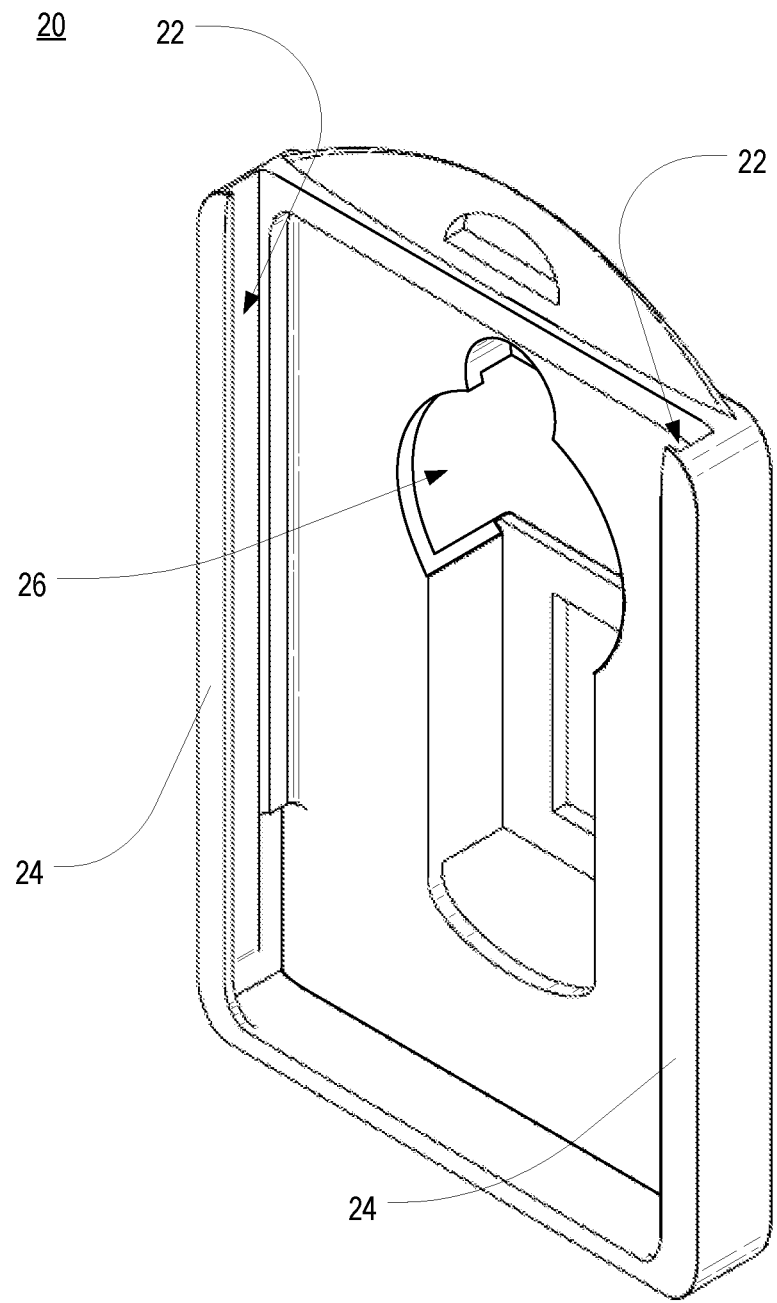
FIG. 3 is a front orthogonal view of the primary housing of the case of FIG. 1.
Figure 4:
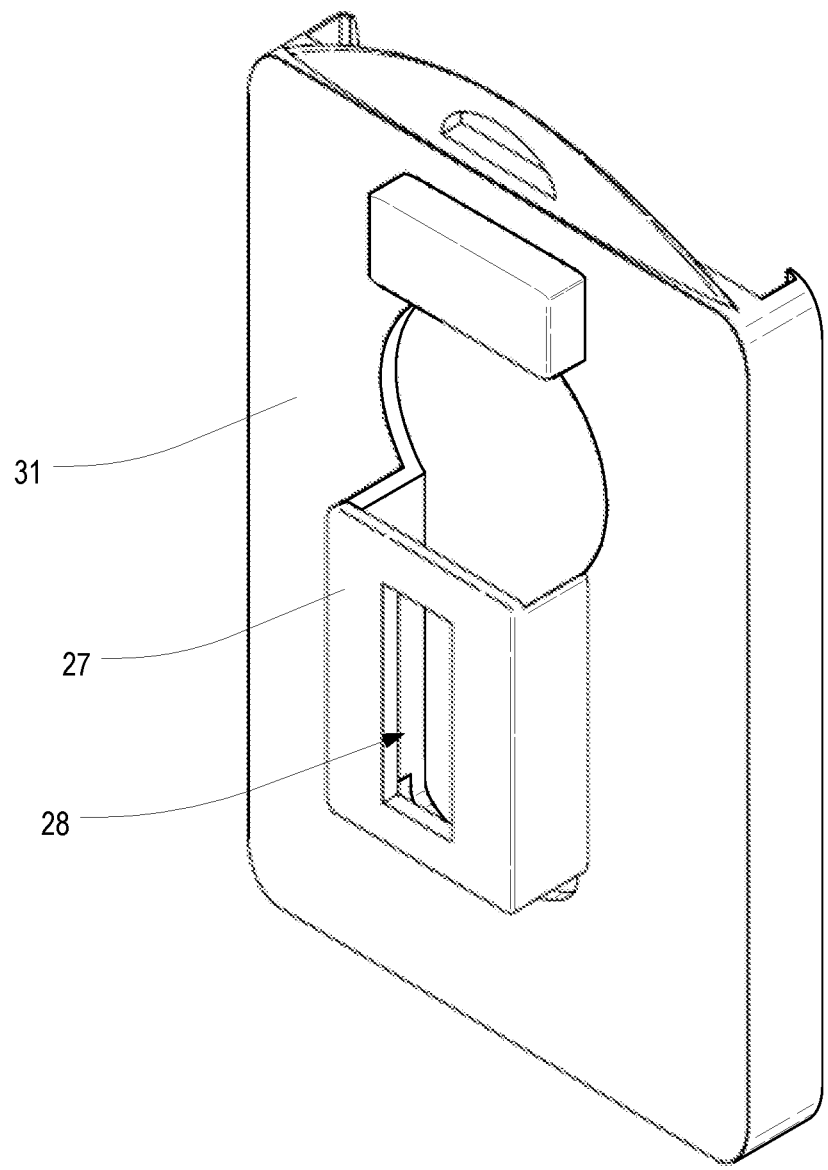
FIG. 4 is a rear orthogonal view of the primary housing of FIG. 3.

FIGS. 3 and 4 are a front orthogonal view and a rear orthogonal view, respectively, of the primary housing 20 of the case 10 of FIG. 1. The primary housing 20 includes two opposed receiving channels 22. Each receiving channel 22 is defined at an inside of a respective widthwise, horizontal side of the primary housing 20. The opposed receiving channels are partially defined by sides of the primary housing 20 and partially defined by protruding edges 24 of a front of the primary housing 20. Preferably, the channels 22 extend lengthwise, vertically along the interior sides of the primary housing 20 through a top of the primary housing 20, such that a top opening of each channel 22 is defined in the top of the primary housing 20. In some embodiments, the channels 22 do not extend into or through a bottom surface of the primary housing 20; instead, a bottom of each channel 22 is flush with an interior surface of a bottom of the primary housing 20. In other embodiments, the channels extend to the bottom surface of the primary housing but there is no channel along the bottom. Preferably, there is no channel defined in the bottom surface of the primary housing 20, thereby making it easier to extract ID cards 102 or the like from the case 10.

It will also be appreciated that receiving channels or other interfaces may be defined in other ways. For example, channels may be arranged in the cover with corresponding structures arranged in the primary housing.

Figure 5:
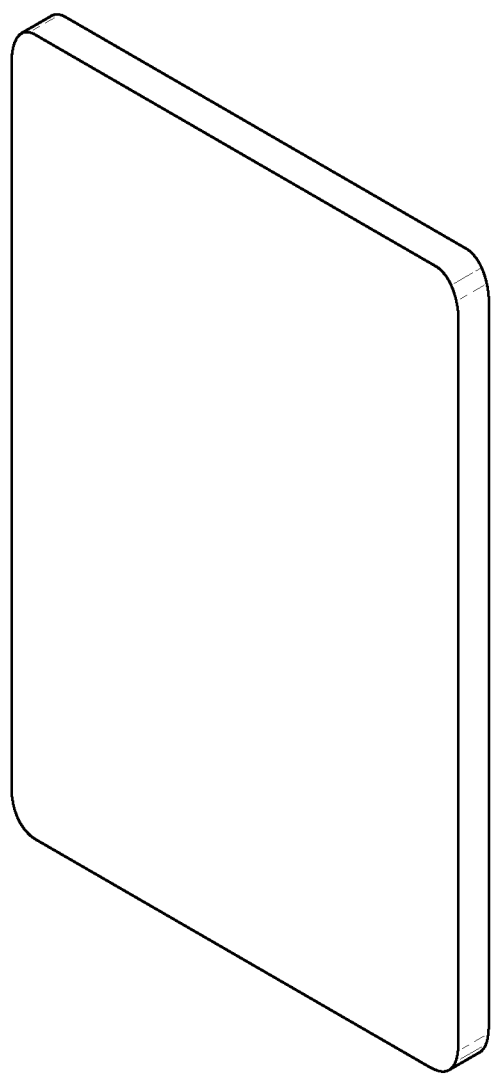
FIG. 5 is a front orthogonal view of the reversible cover of the case of FIG. 1.
Figure 6:
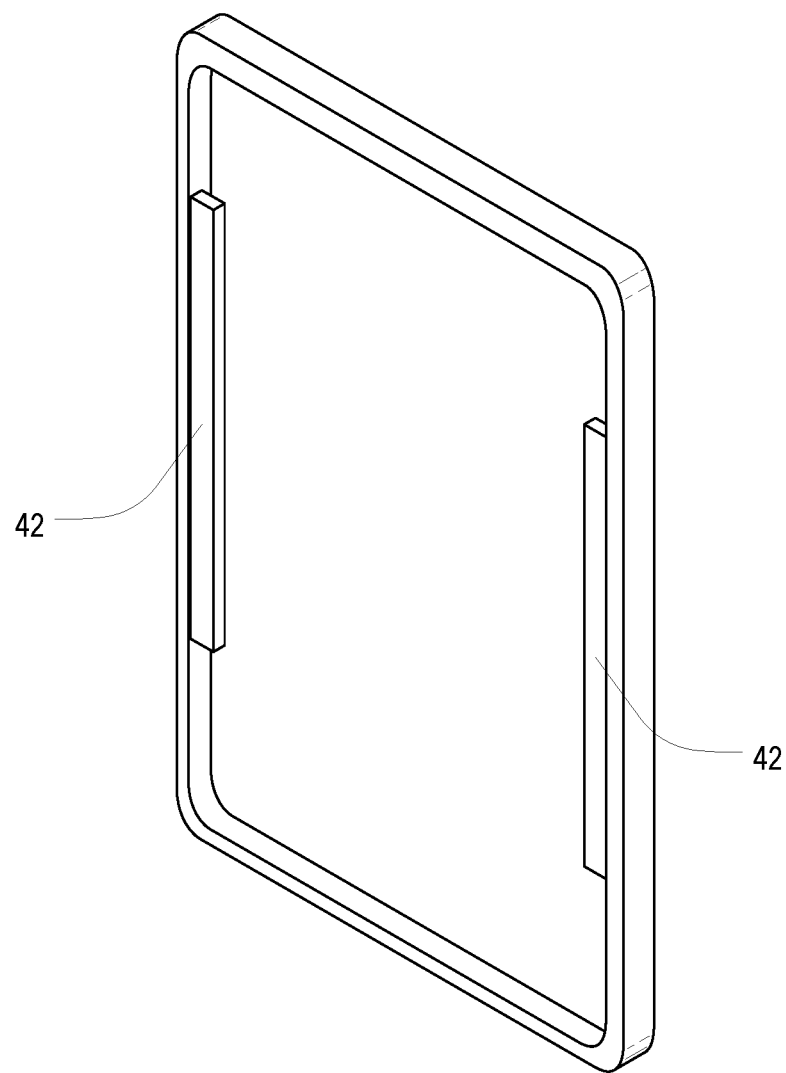
FIG. 6 is a rear orthogonal view of the reversible cover of FIG. 5.
Figure 7:
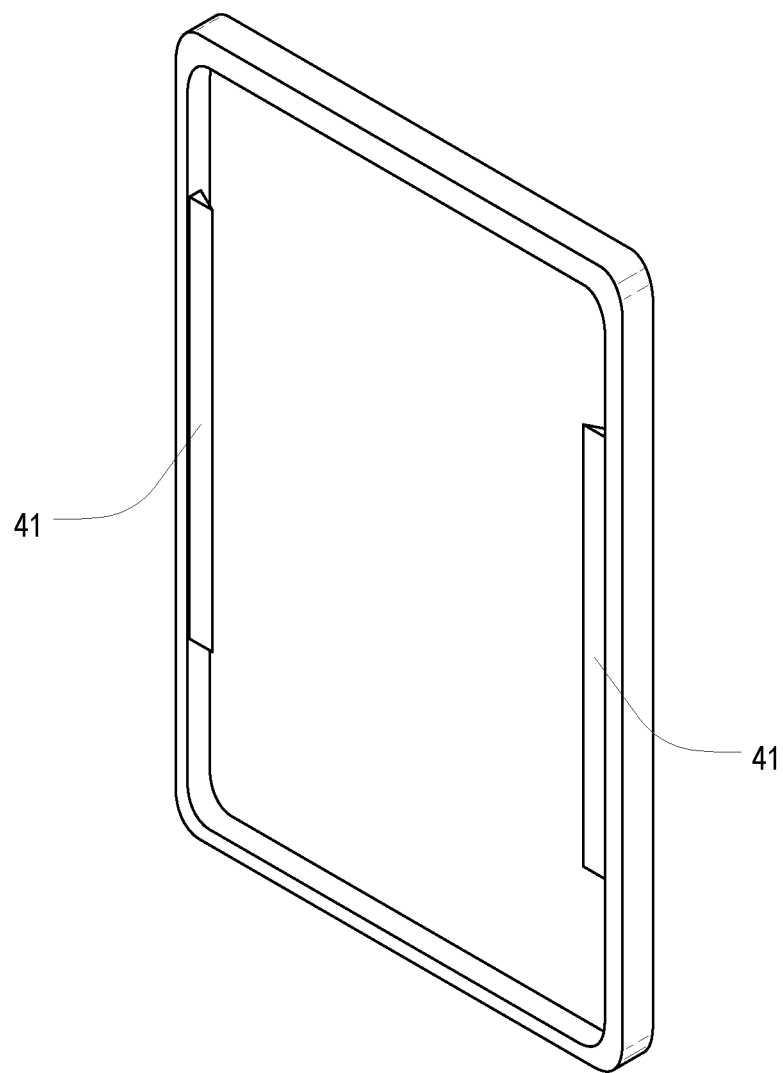
FIG. 7 is a rear orthogonal view of an alternative reversible cover.
Figure 8:
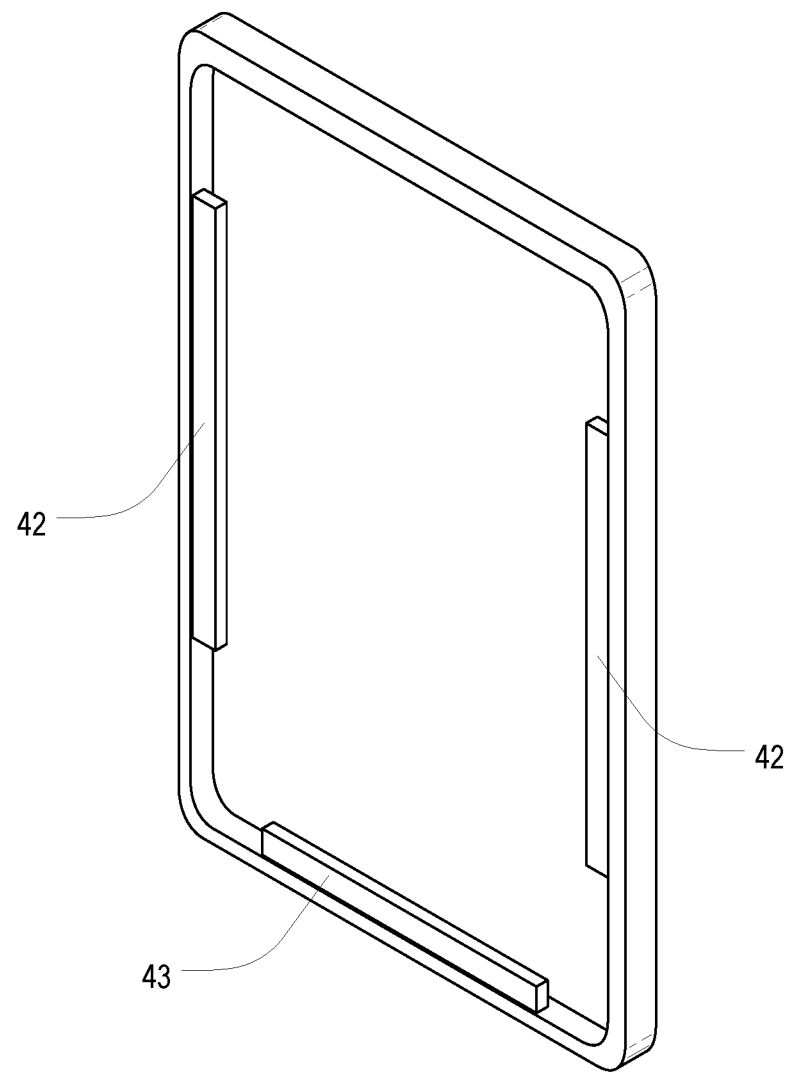
FIG. 8 is a rear orthogonal view of another alternative reversible cover.
Figure 9:
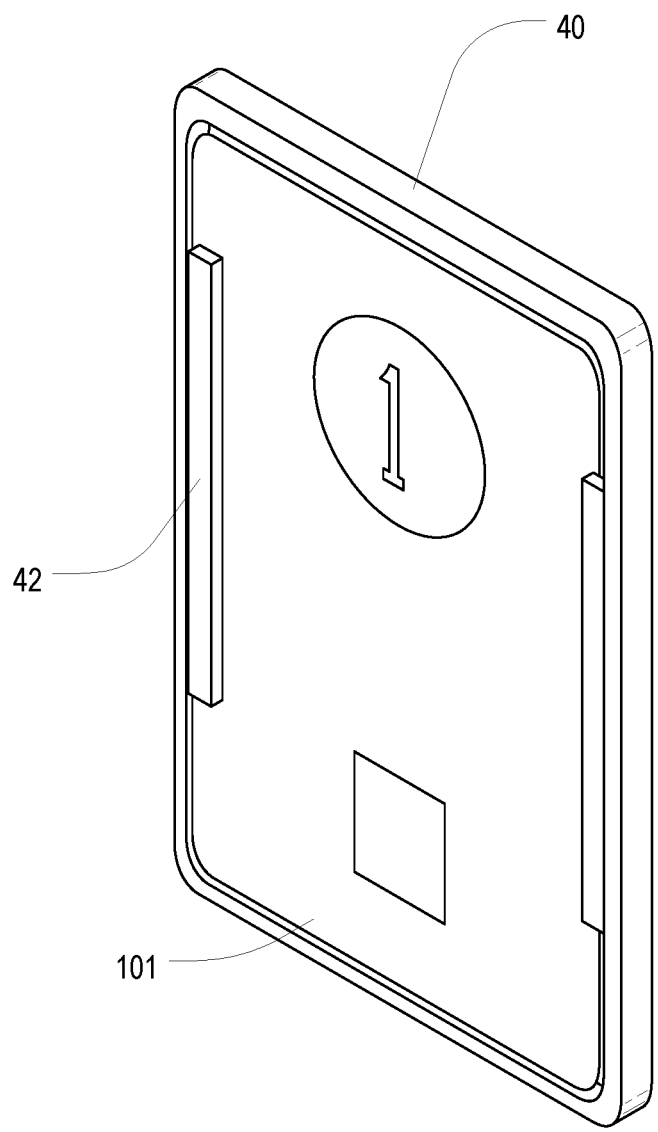
FIG. 9 is a rear orthogonal view of the cover of FIG. 6, shown with an identification card installed therein.

FIGS. 5 and 6 are a front orthogonal view and a rear orthogonal view, respectively, of the reversible cover 40 of the case 10 of FIG. 1. As shown therein, the front is generally featureless, although in various embodiments, decorative or functional features may be added thereto. The rear of the cover 40 includes functional features configured to retain an identification card received within the cover as further described hereinbelow. In the cover 40 shown in FIG. 6, functional features are provided in the form of elongate retention members 42 arranged along the widthwise sides of the cover 40. However, other structures, and/or other structure locations, may additionally or alternatively be utilized. In one example, the retention members 41 may be shaped differently as shown in FIG. 7. In another example, an elongate tab 43 may be provided along the bottom of the cover as shown in FIG. 8. The retention members 42 are configured to retain an identification card received within the cover 40. In this regard, FIG. 9 is a rear orthogonal view of the cover 40 of FIG. 6, shown with an identification card 101 installed therein.

Figure 10:
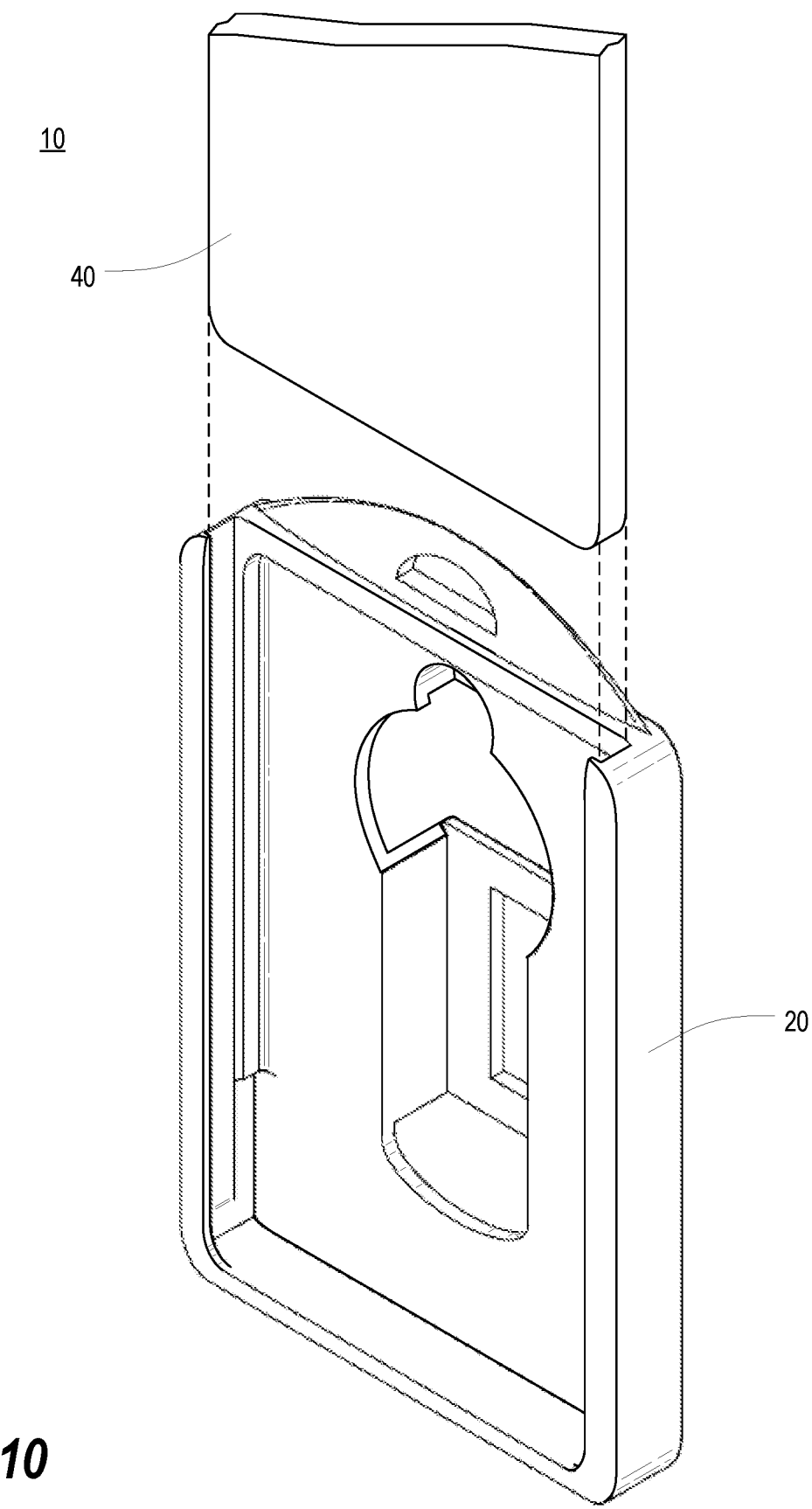
FIG. 10 is a fragmentary front orthogonal view of the case of FIG. 1, shown with the cover aligned with the primary housing.
Figure 11:
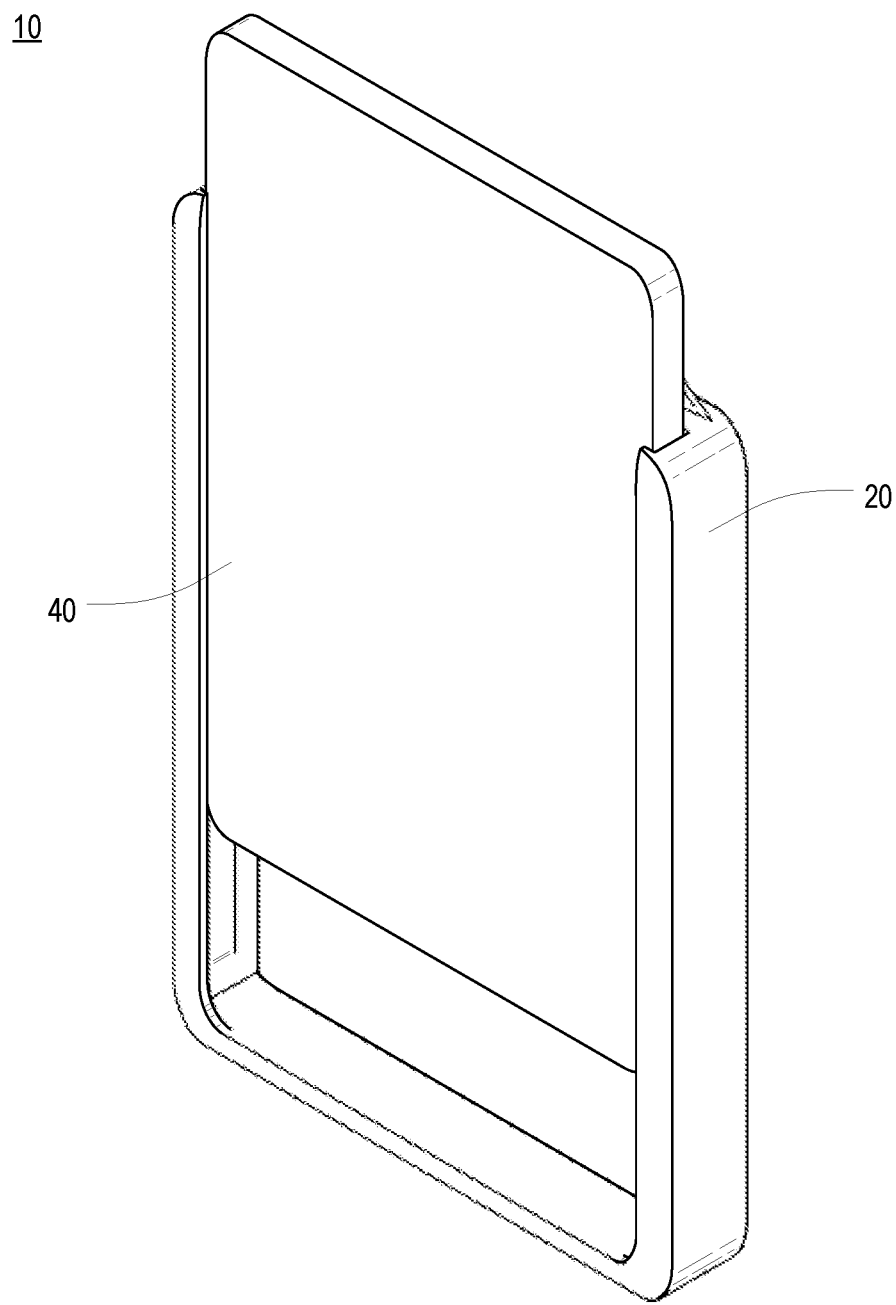
FIG. 11 is a front orthogonal view of the case of FIG. 10, shown with the cover partially installed in the primary housing.
Figure 12:
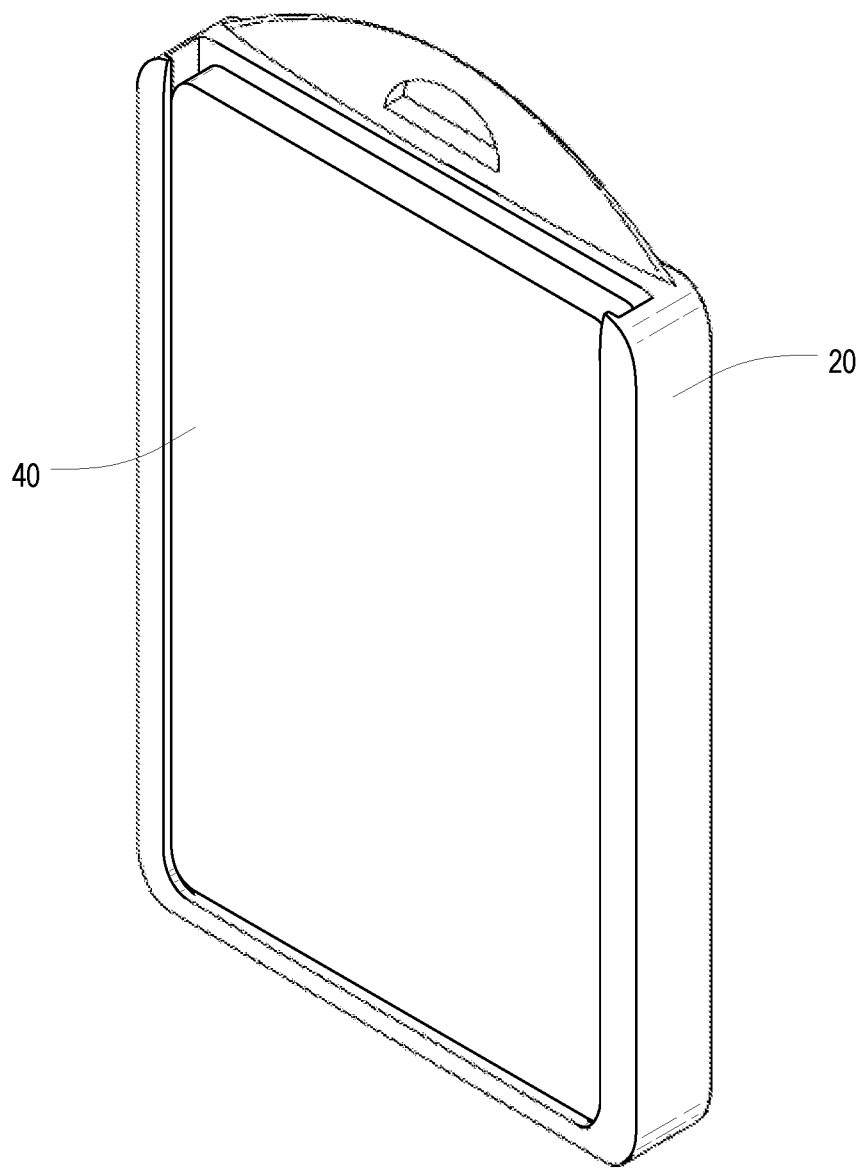
FIG. 12 is a front orthogonal view of the case of FIG. 10, shown with the cover fully installed in the primary housing.

FIG. 10 is a fragmentary front orthogonal view of the case 10 of FIG. 1, shown with the cover 40 aligned with the primary housing 20. The cover 40 is sized and dimensioned to enable the cover to be slid into the primary housing 20 with opposing sides of the cover 40 received within the receiving channels 22 of the primary housing 20, as illustrated in FIGS. 11 and 12. In particular, FIG. 11 is a front orthogonal view of the case 10 of FIG. 10, shown with the cover 40 partially installed in the primary housing 20, and FIG. 12 is a front orthogonal view of the case 10 of FIG. 10, shown with the cover 40 fully installed in the primary housing 20. In accordance with one or more preferred implementations, the cover 40 is sized and dimensioned to enable the cover 40 to be retained within the primary housing 20 by friction. In accordance with one or more preferred implementations, the cover 40 is sized and dimensioned to enable the cover 40 to be retained within the primary housing 20 by friction and gravity. In accordance with one or more preferred implementations, nubs, protruding members, or another mechanism, including the use of a nub/divot or detent locking mechanism, may be utilized to ensure the cover 40 does not slide out inadvertently. At least one such arrangement is described and illustrated elsewhere herein.

Figure 13:
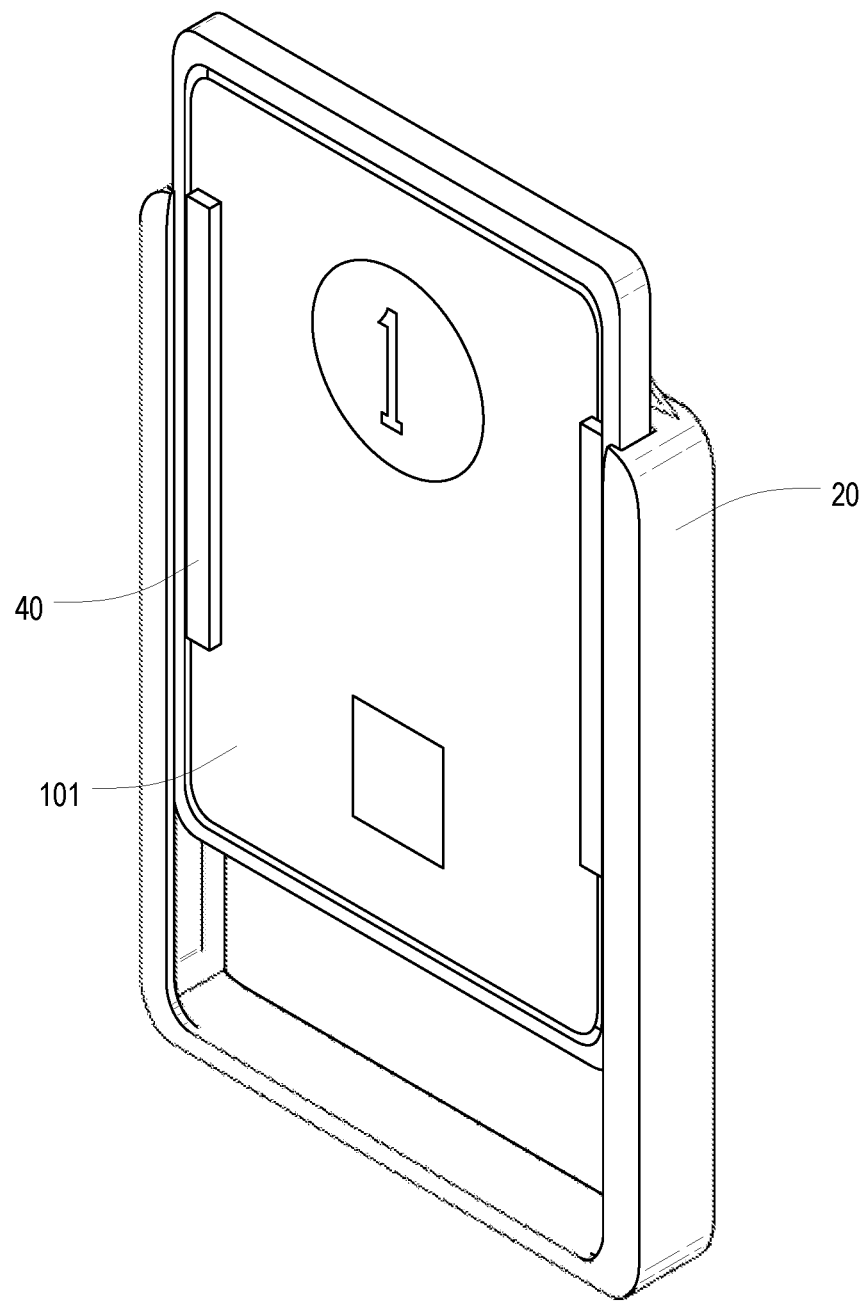
FIG. 13 is a front orthogonal view of the primary housing of FIG. 3 with the cover and identification card partially installed therein in a card display state.
Figure 14:
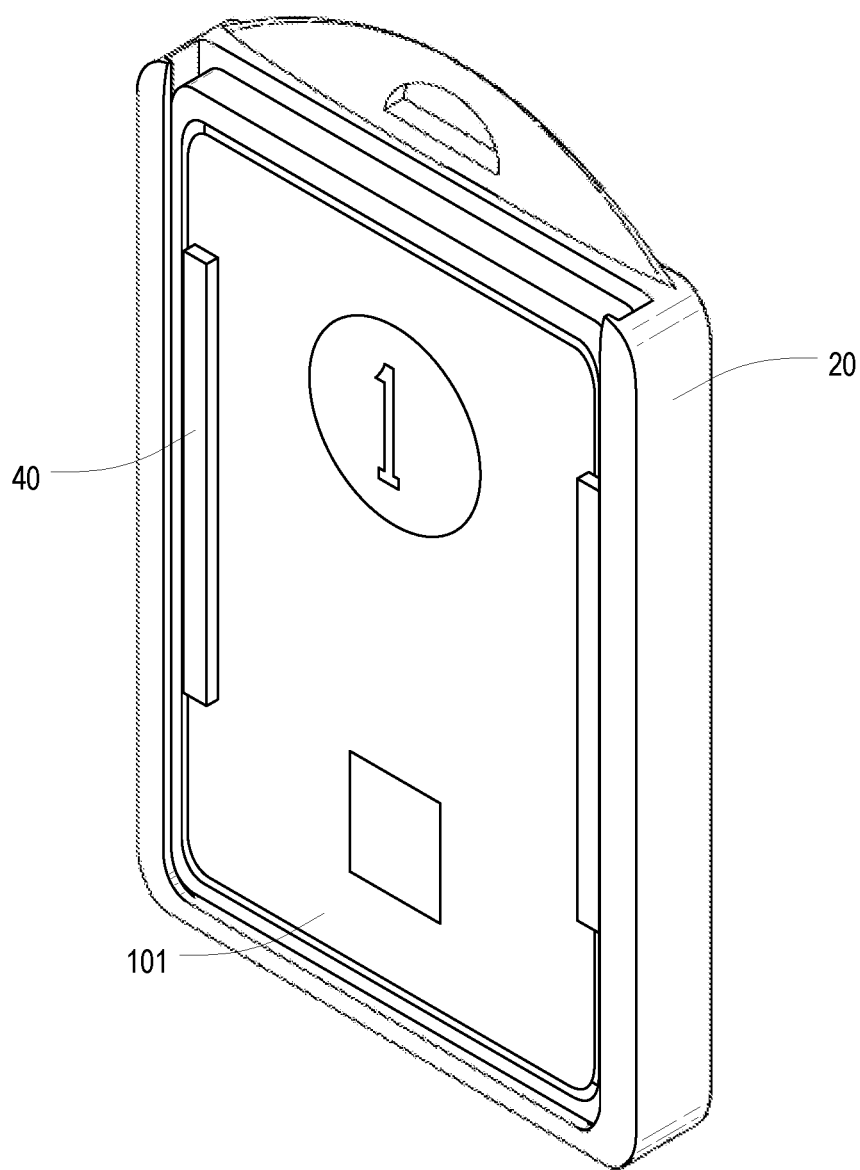
FIG. 14 is a front orthogonal view of the primary housing of FIG. 3 with the cover and identification card fully installed therein in a card display state.

As described above, the cover 40 can be installed in the primary housing 20 by sliding sides of the cover 40 into the receiving channels 22 of the primary housing 10. FIG. 13 is a front orthogonal view of the primary housing 20 of FIG. 3 with the cover 40 and identification card 101 partially installed therein in a card display state. This state can be characterized as a card display state in that the card is displayed outward for viewing. FIG. 14 is a front orthogonal view of the primary housing 20 of FIG. 3 with the cover 40 and identification card 101 fully installed therein in a card display state. By contrast, the state of the cover 40 in FIGS. 11 and 12 may be characterized as a card conceal state in that any card installed therein faces inward such that it cannot be seen. Notably, the nubs, protruding members, nub/divot or detent locking mechanism, or other mechanism, if provided, may again be utilized to ensure the cover 40 does not slide out inadvertently. Because the case 40 may be installed in either the card display state or the card conceal state, such mechanism is preferably arranged to function the same way whether the cover 40 faces outward or inward.

Figure 15:
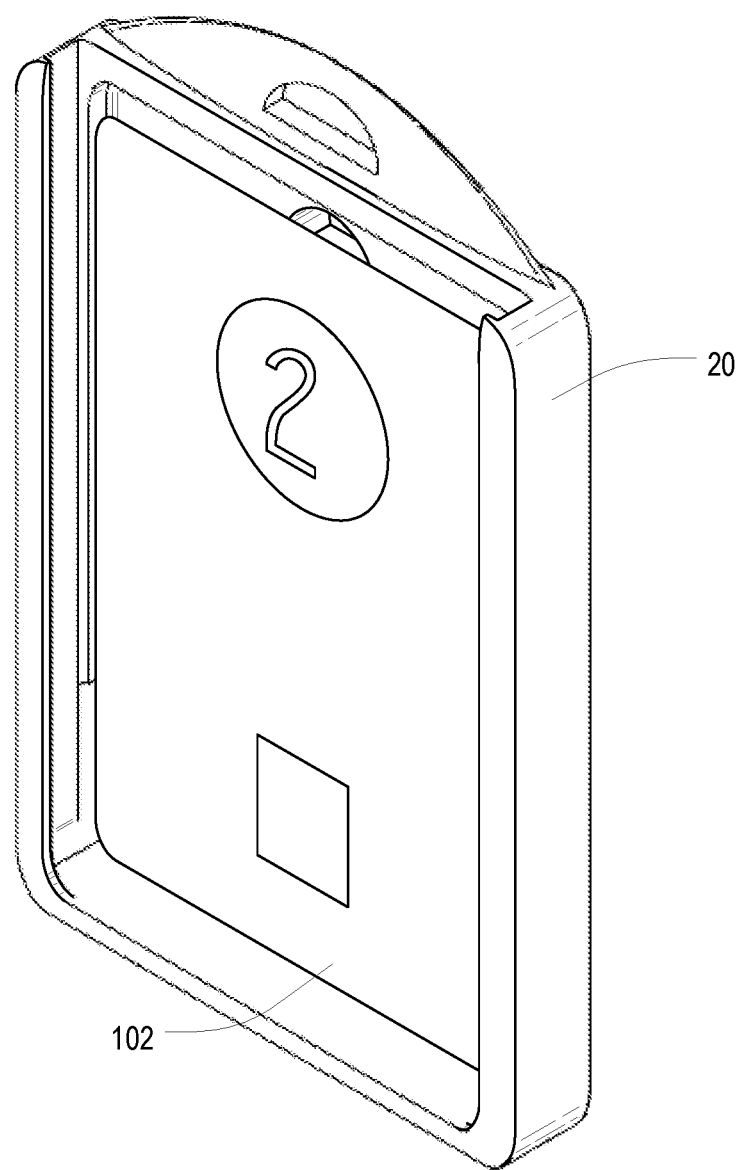
FIG. 15 is a front orthogonal view of the primary housing of FIG. 3, shown with a second identification card stored therein.
Figure 16:
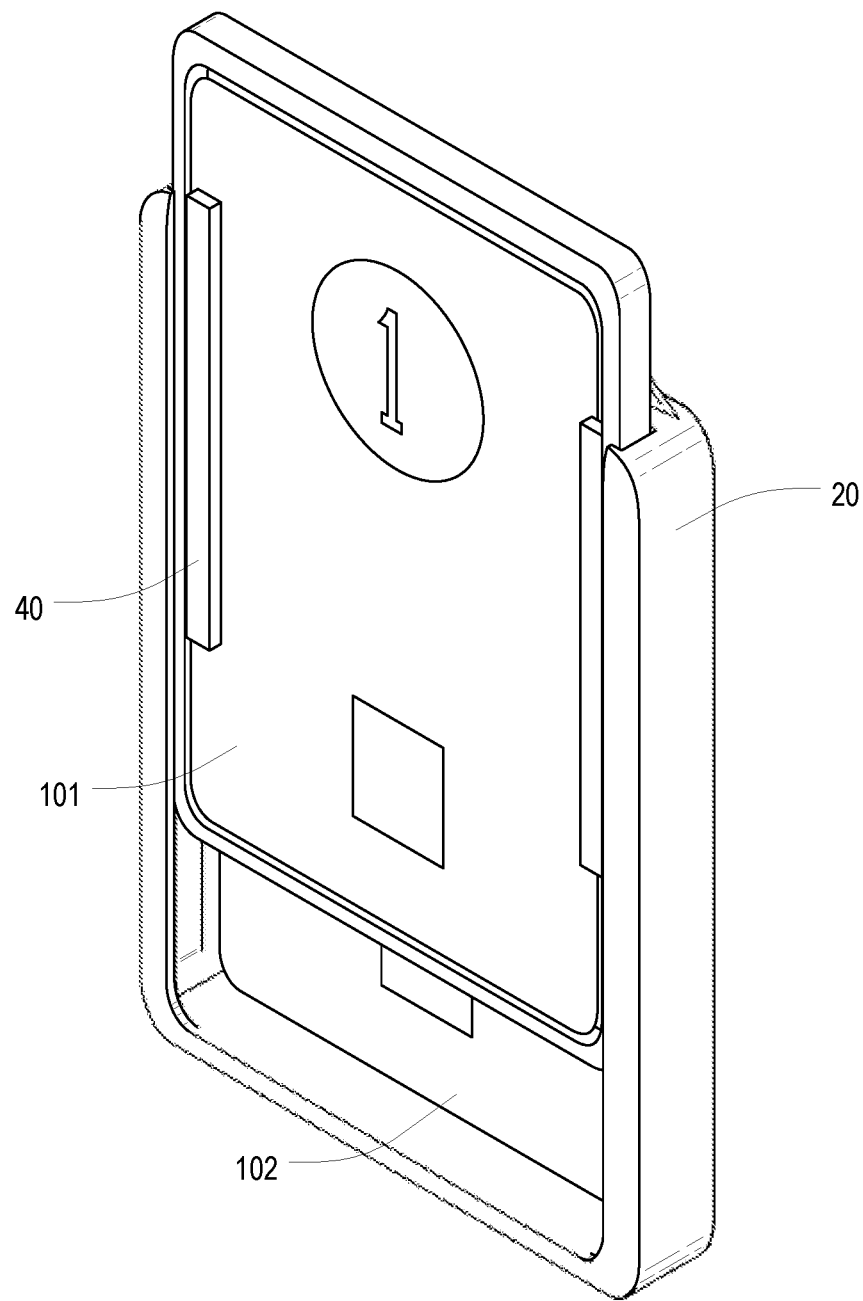
FIG. 16 is a front orthogonal view of the primary housing of FIG. 15 with the cover and first identification card partially installed therein in a card display state.

In accordance with one or more preferred implementations, the case 10 is configured, e.g. sized and dimensioned, to enable storage of one or more additional identification cards in the primary housing 20, with the additional cards being retained behind the cover 40 when the cover 40 is installed in the primary housing 20. In this regard, FIG. 15 is a front orthogonal view of the primary housing 20 of FIG. 3, shown with a second identification card 102 stored therein, and FIG. 16 is a front orthogonal view of the primary housing 20 of FIG. 15 with the cover 40 and first identification card 101 partially installed therein in a card display state, with the second identification card 102 stored in the primary housing 20 being retained behind the cover 40.

Figure 17:
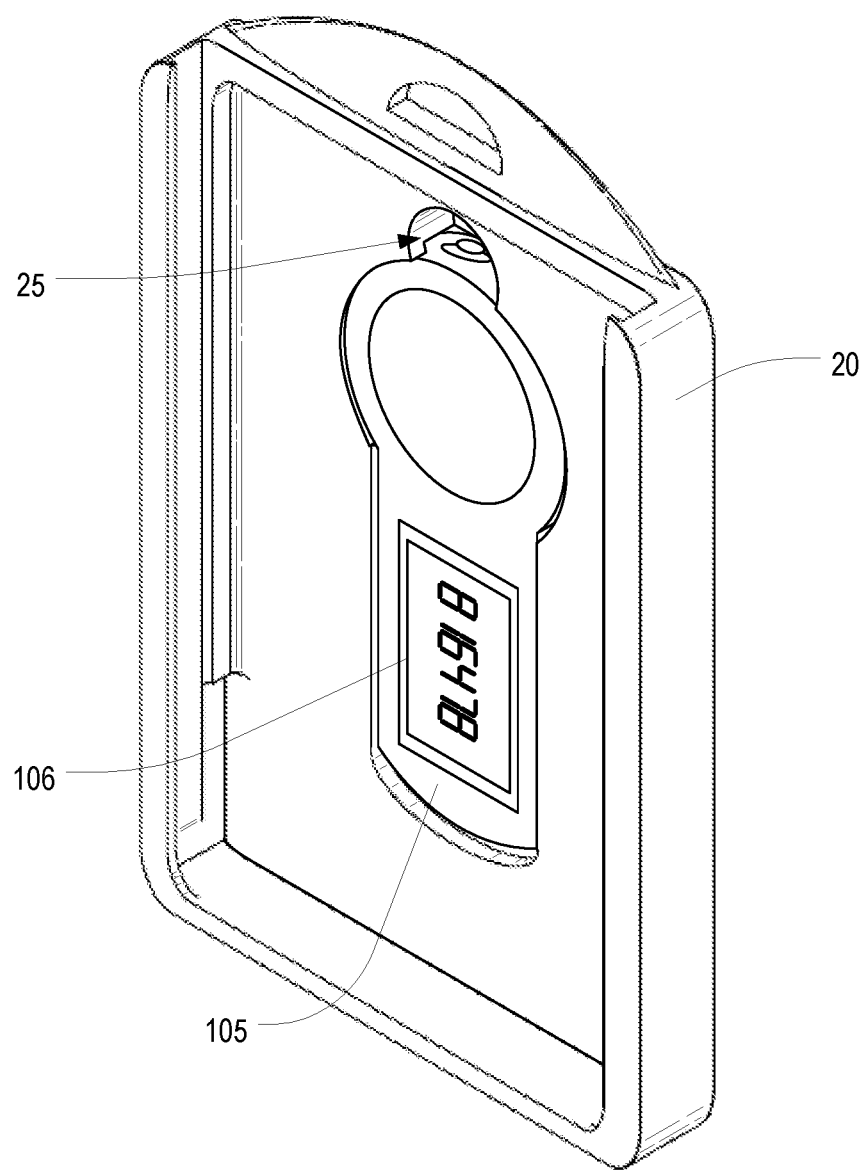
FIG. 17 is a front orthogonal view of the primary housing of FIG. 3, shown with a security token installed therein in a screen conceal state.

In accordance with one or more preferred implementations, the case 10 is further configured to receive and retain a security token for storage, e.g. an electronic security token such as an RSA SecurID key fob. For example, in the case 10 of FIGS. 3 and 4, an inset frame 27 protrudes from a rear panel 31 of the primary housing 20 and defines a cutout opening 26 that is shaped and dimensioned to correspond to a shape of a security token 105 so as to allow the security token 105 to be inserted into and retained therein. In this regard, FIG. 17 is a front orthogonal view of the primary housing 20 of FIG. 3, shown with a security token 105 installed therein.

Figure 18:
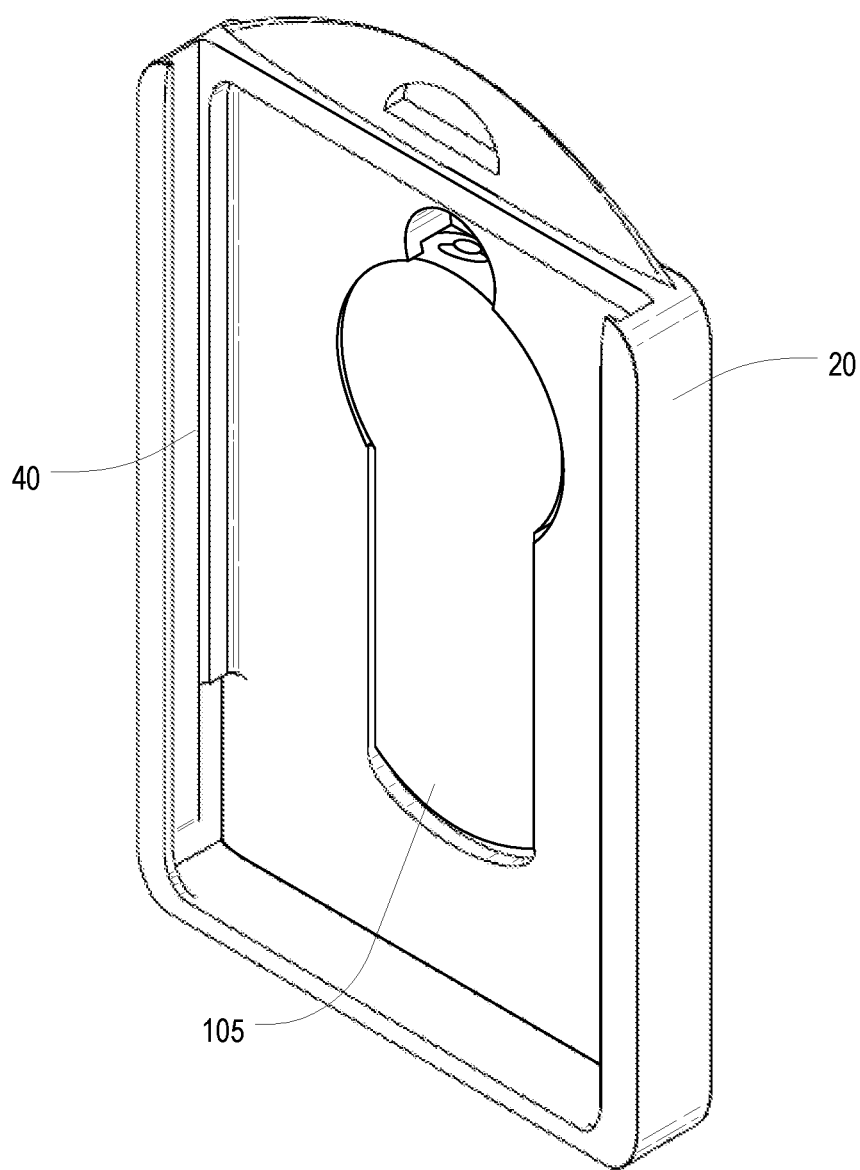
FIG. 18 is a front orthogonal view of the primary housing of FIG. 3, shown with a security token installed therein in a screen display state.
Figure 19:
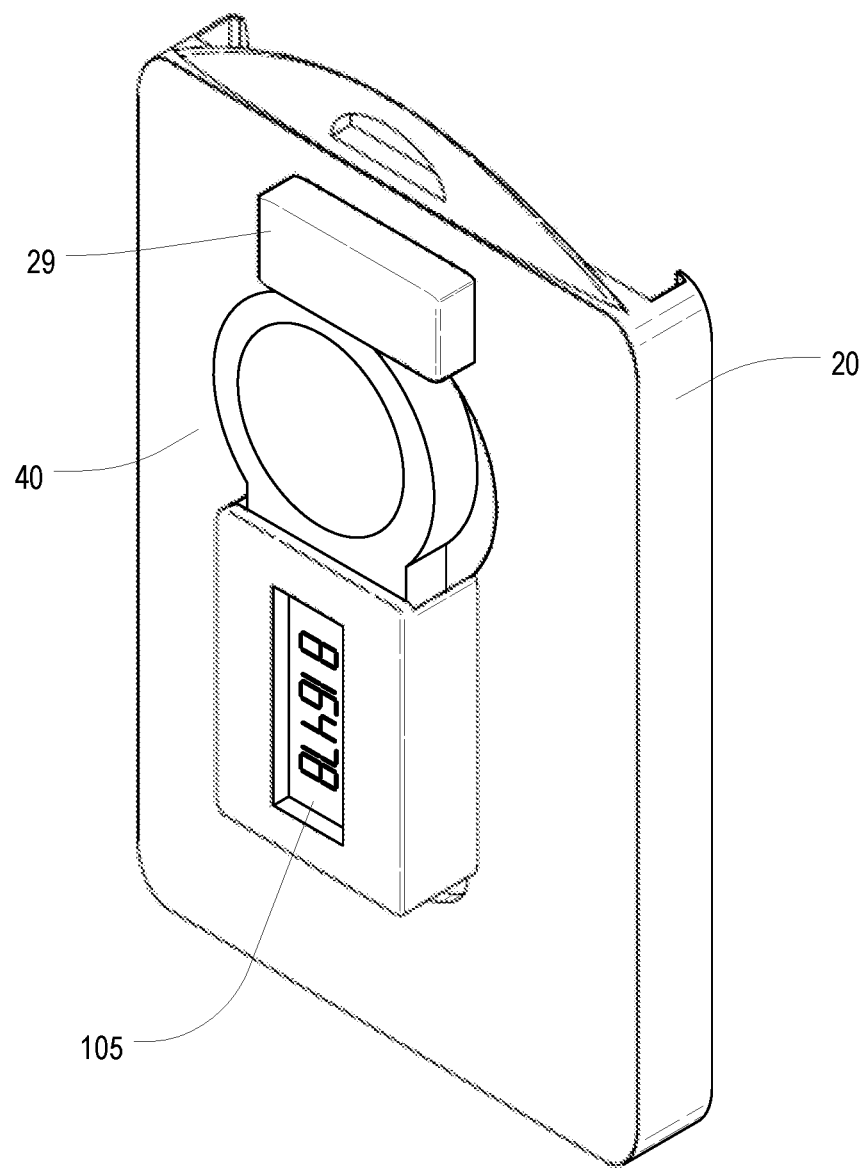
FIG. 19 is a rear orthogonal view of the primary housing and security token of FIG. 18.

An electronic security token typically includes an electronic display screen configured to display a code or other information. However, most security tokens, such as the security token 105 illustrated in FIG. 17, only include a display screen 106 on a single side thereof. Thus, in at least some embodiments, the security token 105 may be inserted in different orientations or states. For example, in FIG. 17, the security token 105 is installed facing inward, such that the display screen 106 faces into the case 10. However, the security token 105 may alternatively be installed so as to make the display screen 106 visible from outside the case 10. As shown in FIG. 4, the inset frame 27 preferably includes a view cutout 28 that is sized, dimensioned, and positioned to correspond to the display screen 106 of the security token 105 when such security token is received in the inset frame 27. In this regard, FIGS. 18 and 19 are a front orthogonal view and a rear orthogonal view, respectively, of the primary housing 20 of FIG. 3, shown with the security token 105 installed therein in a display state. The security token 105 can be characterized as being installed in a screen display state when the security token 105 is installed such that its display screen 106 is visible through the view cutout 28. Conversely, when the security token 105 is installed such that its display screen 106 is not visible through the view cutout 28, as shown in FIG. 17, a security token can be characterized as being installed in a screen conceal state.

The primary housing 20 preferably further includes a top cutout 25 extending from or forming part of the cutout opening 26. The top cutout 25 is preferably configured to provide space to accommodate a key ring, switch, or button located at a corresponding portion of an inserted security token. Preferably, a shielding portion 29 protruding from the same side of the primary housing 20 as the inset frame 27 shields the top cutout 25, and any key ring, switch, or button disposed thereat.

It will be appreciated that the exact sizes and shapes of the inset frame 27, cutout opening 26, view cutout 28, and top cutout 25 may be varied to correspond to the particular size and shape of the security token 105 and display screen 106 with which it is to be used.

In accordance with one or more preferred methodologies of use, the case 10 is utilized to securely store one or more ID cards as well as a security token. In accordance with a preferred methodology of use, an ID card such as the ID card 101 is installed in the cover 40 as illustrated in FIG. 9, and the cover 40 with such ID card 101 is installed in the primary housing 20 in the card display state as illustrated in FIGS. 13 and 14. The cover 40 can be removed, reversed, and reinserted to transition it out of the card display state and into the card conceal state. In the card conceal state, as shown in FIG. 12, the ID card 101 is concealed from view and protected from exposure to the elements. The cover 40 can also be removed, or partially removed, to insert one or more additional cards for storage in the case 10. These may be ID cards, or other cards such as credit cards, debit cards, and/or the like.

A security token 105 can be installed in the case 10 by removing the cover 40 and any additional cards stored in the case 10, and then inserting the security token 105 into the cutout opening 26 such that it is received in the inset frame 27. The security token 105 can be installed in the screen display state where the display screen 106 is visible through the view cutout 28, or in the screen conceal state where the display screen 106 is not externally visible. After the security token 105 is installed, any additional cards can be reinserted for storage, and the cover 40 reinserted to close the case 10 and secure the security token 105 (and any additional cards) therein. The security token 105 can subsequently be transitioned from one state to another by again removing the cover 40 and any additional cards stored in the case 10, and then removing the security token 105 and flipping it over before reinserting it into the cutout opening 26 such that it is received in the inset frame 27.

Figure 20:
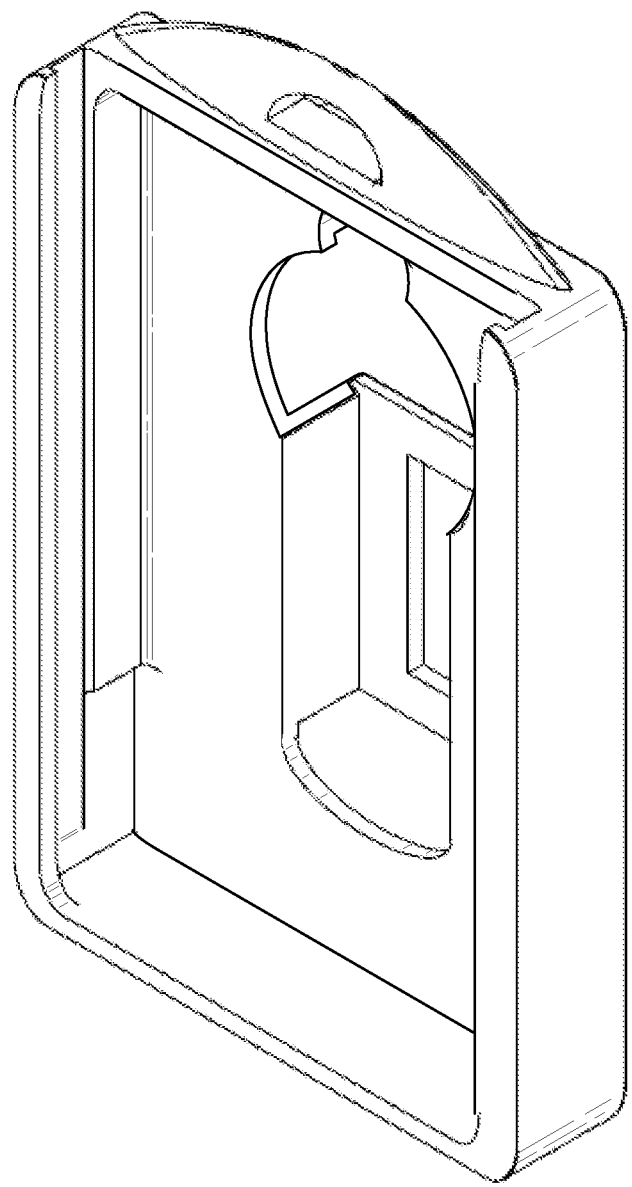
FIG. 20 is a front orthogonal view of a larger primary housing, for use with the reversible cover of FIGS. 3 and 4, in accordance with one or preferred embodiments of the present invention.
Figure 21:
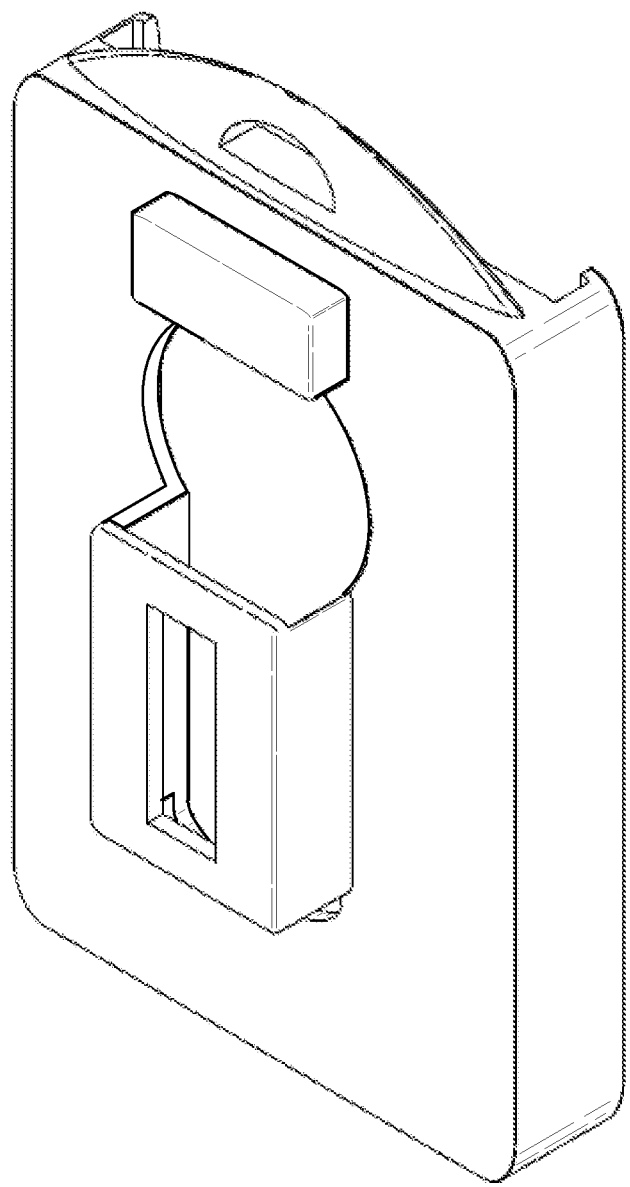
FIG. 21 is a rear orthogonal view of the larger primary housing of FIG. 20.

The size and proportions of the case 10 may be varied to provide differing storage capacity and/or for other purposes. For example, FIGS. 20 and 21 are a front orthogonal view and a rear orthogonal view, respectively, of a larger primary housing 120, for use with the reversible cover 40 of FIGS. 3 and 4, in accordance with one or preferred embodiments of the present invention. This primary housing 120 is deeper than the primary housing of FIGS. 1-4 and is capable of accommodating a larger number of ID cards and/or other cards.

Figure 22:
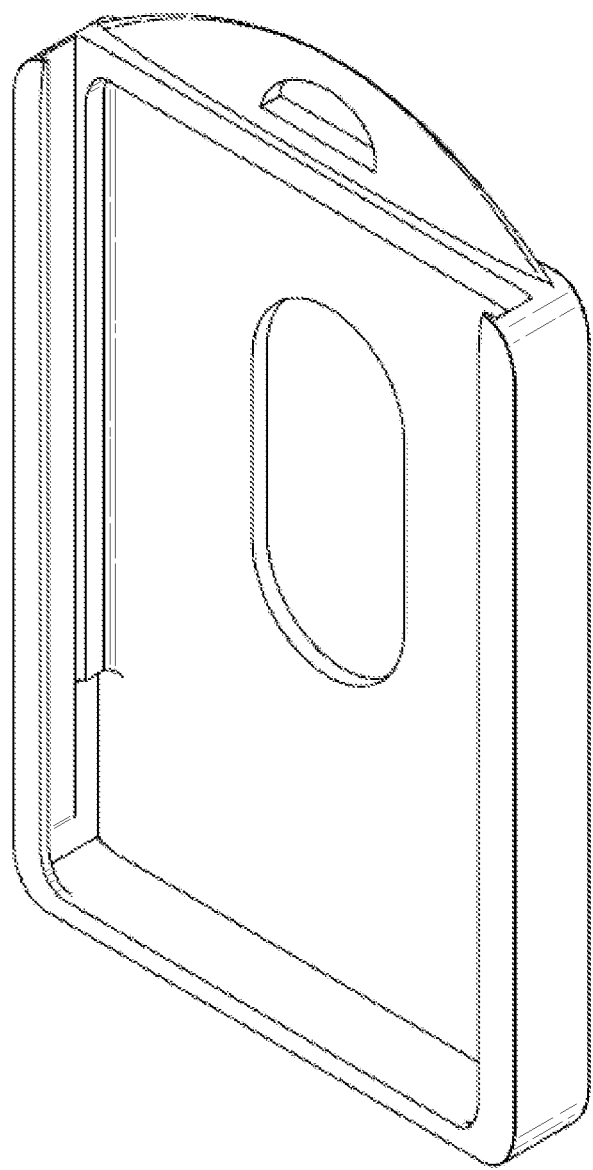
FIG. 22 is a front orthogonal view of an alternative primary housing, for use with the reversible cover of FIGS. 3 and 4, in accordance with one or preferred embodiments of the present invention.
Figure 23:
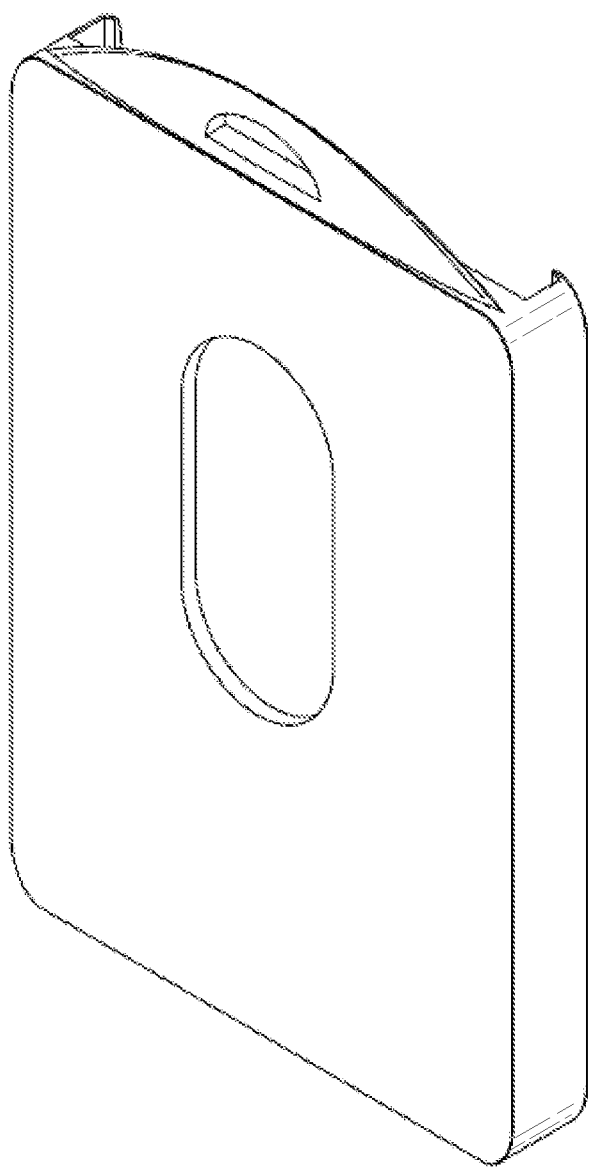
FIG. 23 is a rear orthogonal view of the alternative primary housing of FIG. 22.
Figure 24:
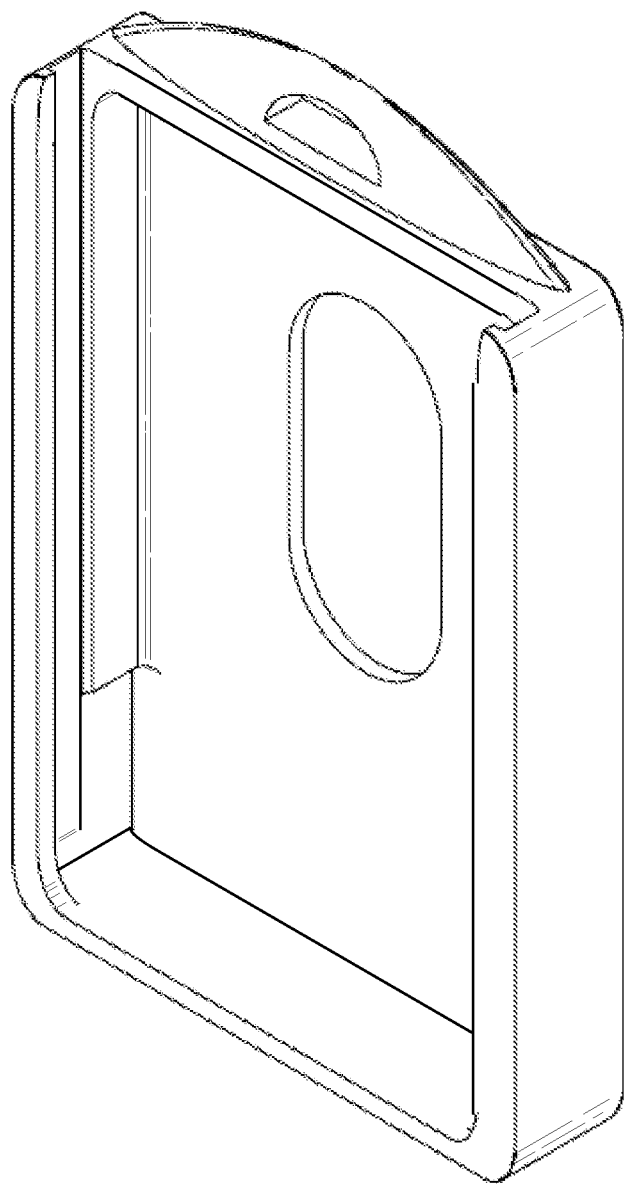
FIG. 24 is a front orthogonal view of a larger alternative primary housing, for use with the reversible cover of FIGS. 3 and 4, in accordance with one or preferred embodiments of the present invention.
Figure 25:
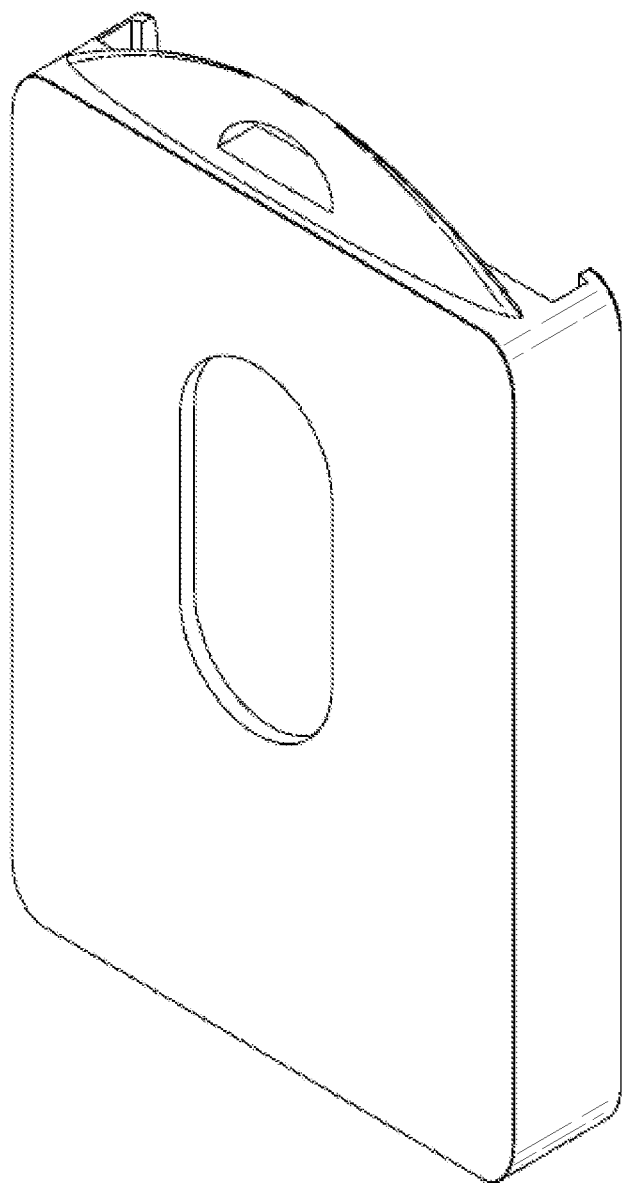
FIG. 25 is a rear orthogonal view of the larger alternative primary housing of FIG. 20.

In some embodiments, no accommodation is made for security tokens. For example, FIGS. 22 and 23 are a front orthogonal view and a rear orthogonal view, respectively, of an alternative primary housing 220, for use with the reversible cover 40 of FIGS. 3 and 4, in accordance with one or preferred embodiments of the present invention, and FIGS. 24 and 25 are a front orthogonal view and a rear orthogonal view, respectively, of a larger alternative primary housing 320, for use with the reversible cover 40 of FIGS. 3 and 4, in accordance with one or preferred embodiments of the present invention. The housing 220 of FIGS. 22 and 23 and the housing 320 of FIGS. 24 and 25 do not include an inset frame for a security token.

Figure 26:
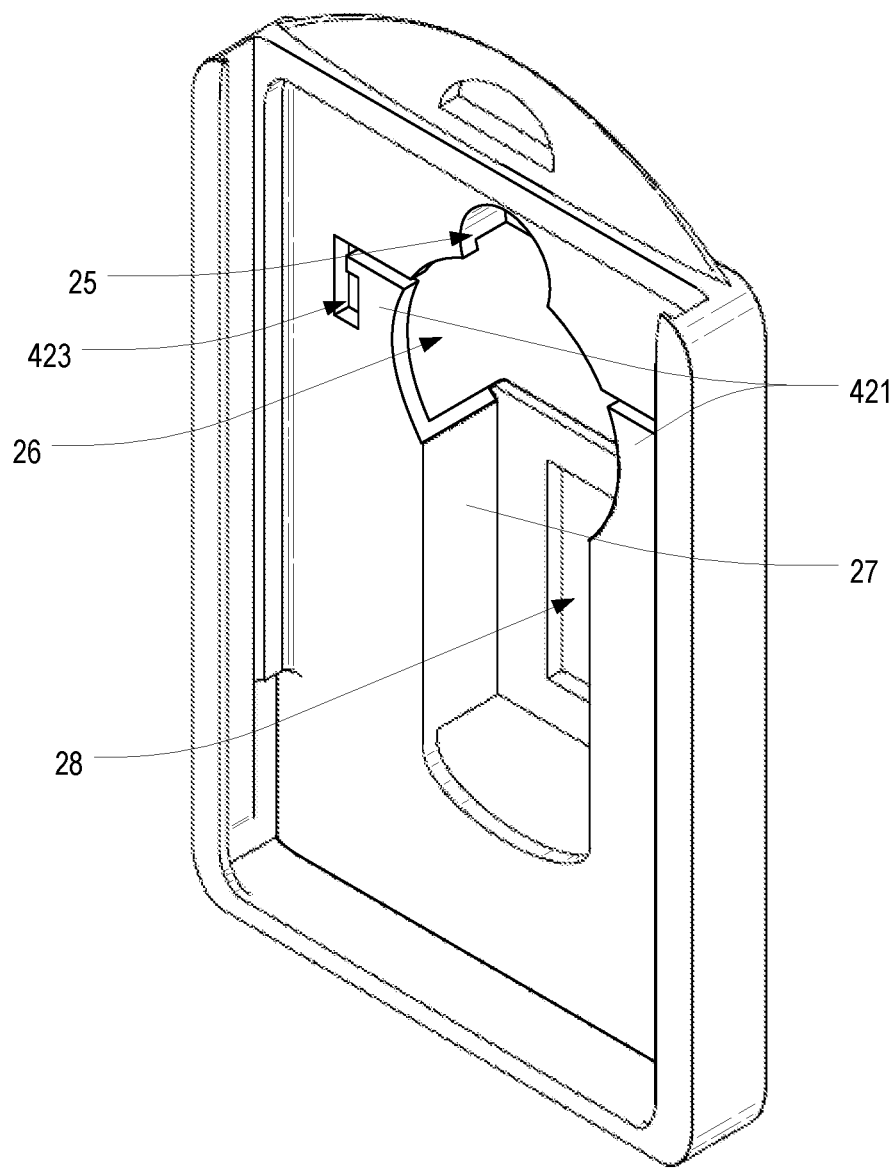
FIG. 26 is a front orthogonal view of a modified primary housing, for use with the reversible cover of FIGS. 3 and 4, in accordance with one or preferred embodiments of the present invention.
Figure 27:
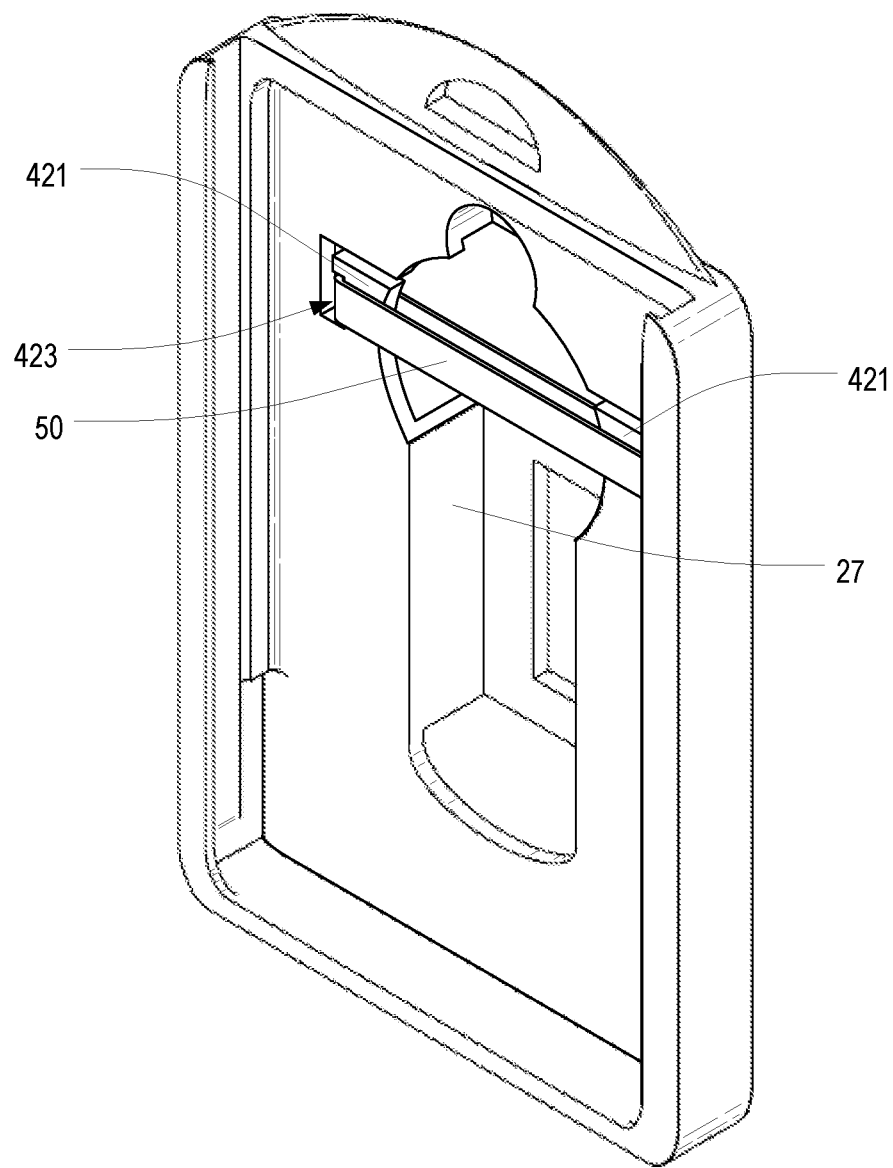
FIG. 27 is a front orthogonal view of the modified primary housing of FIG. 26, shown with an elastic band installed therein.
Figure 28:
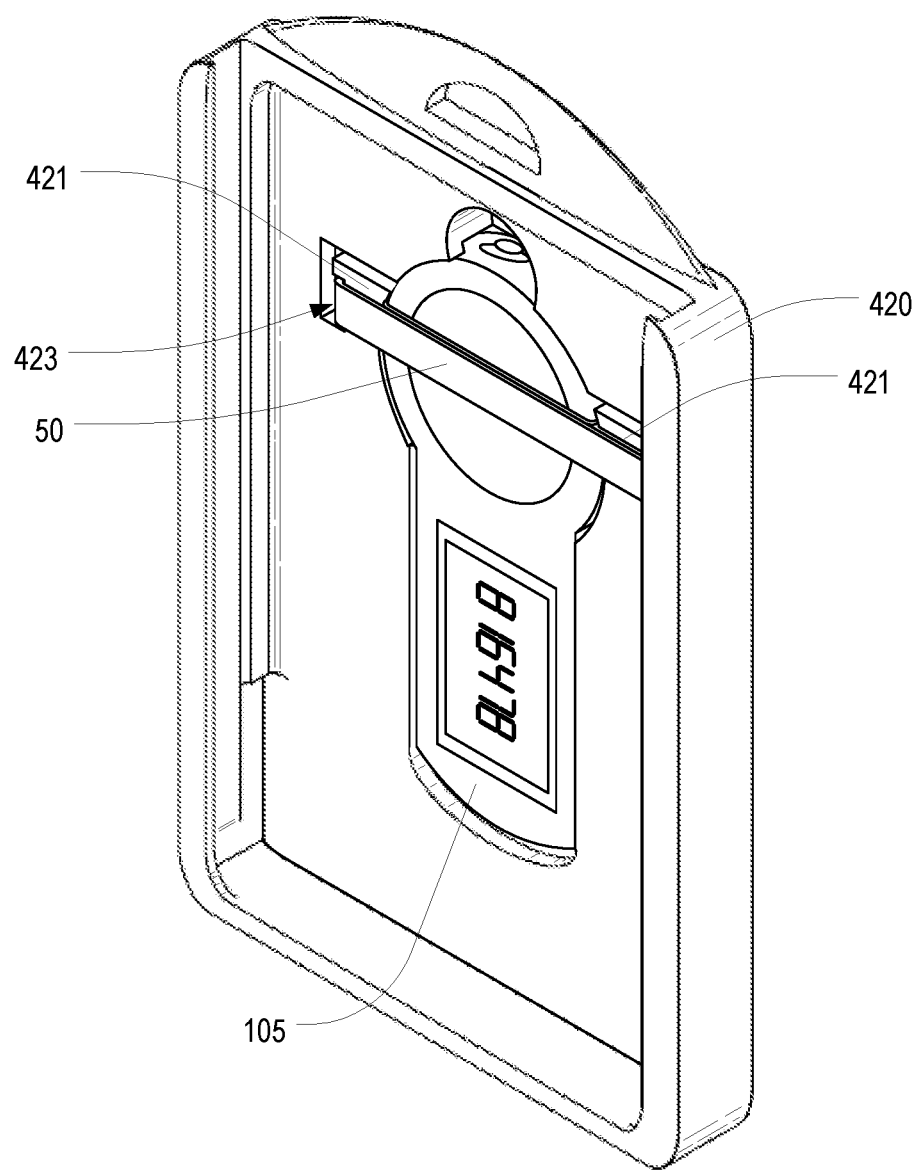
FIG. 28 is a front orthogonal view of the modified primary housing of FIG. 27, shown in a security token mounted therein and retained by the elastic band.

In some embodiments, additional features may be provided to better retain a security token 105 in place inside a case. In this regard, FIG. 26 are front orthogonal views of a modified primary housing 420, for use with the reversible cover 40 of FIGS. 3 and 4, in accordance with one or preferred embodiments of the present invention. As perhaps best shown in FIG. 26, the modified primary housing 420 includes a pair of stubs 421, defined in the illustrated embodiment by corresponding slots 423, which are adapted to retain an elastic band 50, as shown in FIG. 27. The elastic band 50 conveniently holds the security token (fob) 105 in place while it is mounted in the inset frame 27, as shown in FIG. 28. If desired, the elastic band 50 may be removed via the slots 423. It will be appreciated that other mechanisms for retaining the security token 105 may be utilized instead, including a permanently attached elastic band, a solid bar or panel, a clip, or the like.

Figure 29:
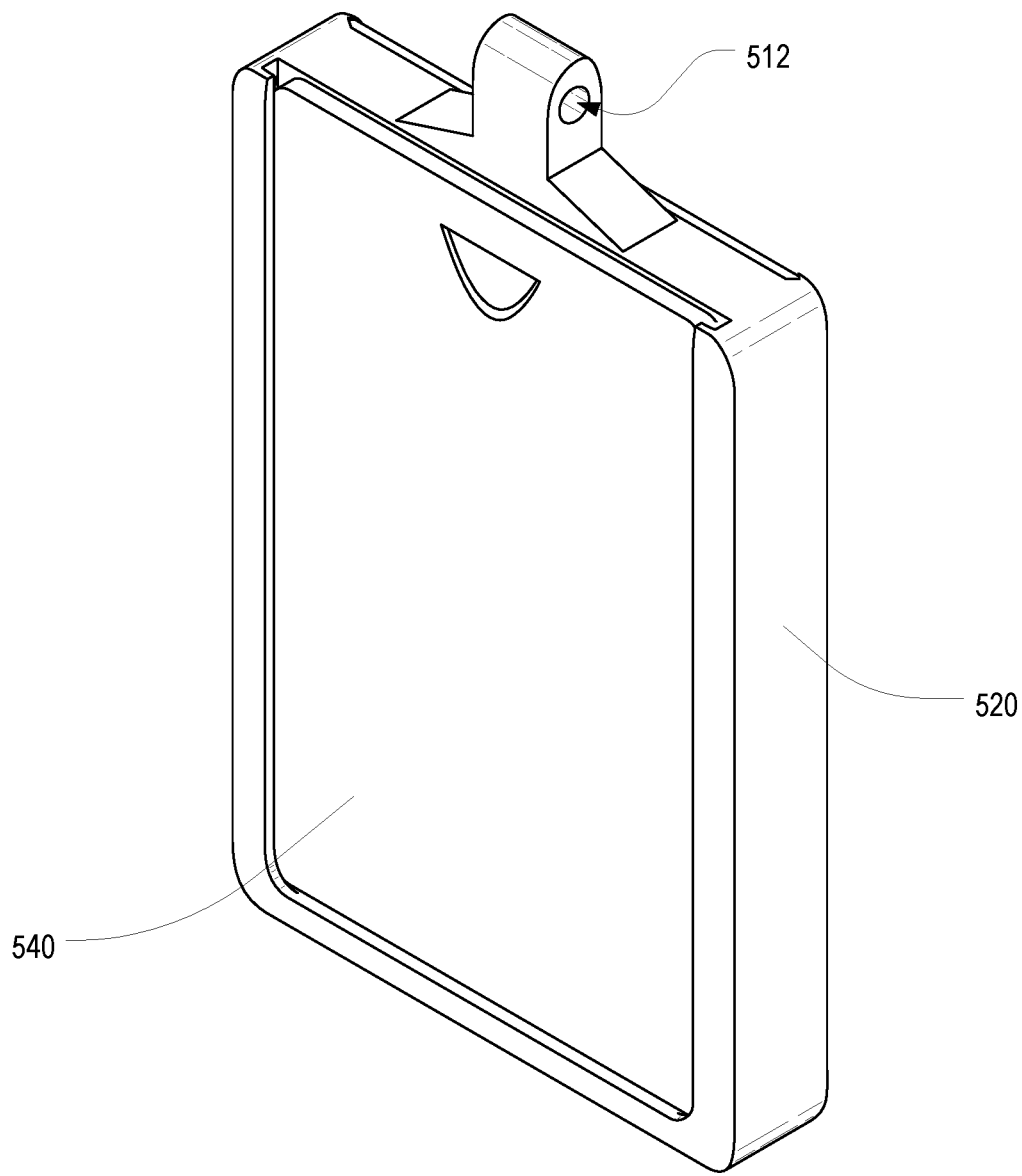
FIG. 29 is a front orthogonal view of a case for identification cards with a reversible front cover and a replaceable rear panel in accordance with one or more preferred embodiments of the present invention.

In some embodiments, the rear panel of the case may be removable and preferably replaceable. In this regard, FIG. 29 is a front orthogonal view of a case 510 for identification cards with a reversible front cover 540 and a replaceable rear panel in accordance with one or more preferred embodiments of the present invention. The case 510 includes a primary housing 520 that includes a securement opening 512 disposed near a top of the case 510 for use in securing the case 510 to a lanyard 11 or clip.

Figure 30:
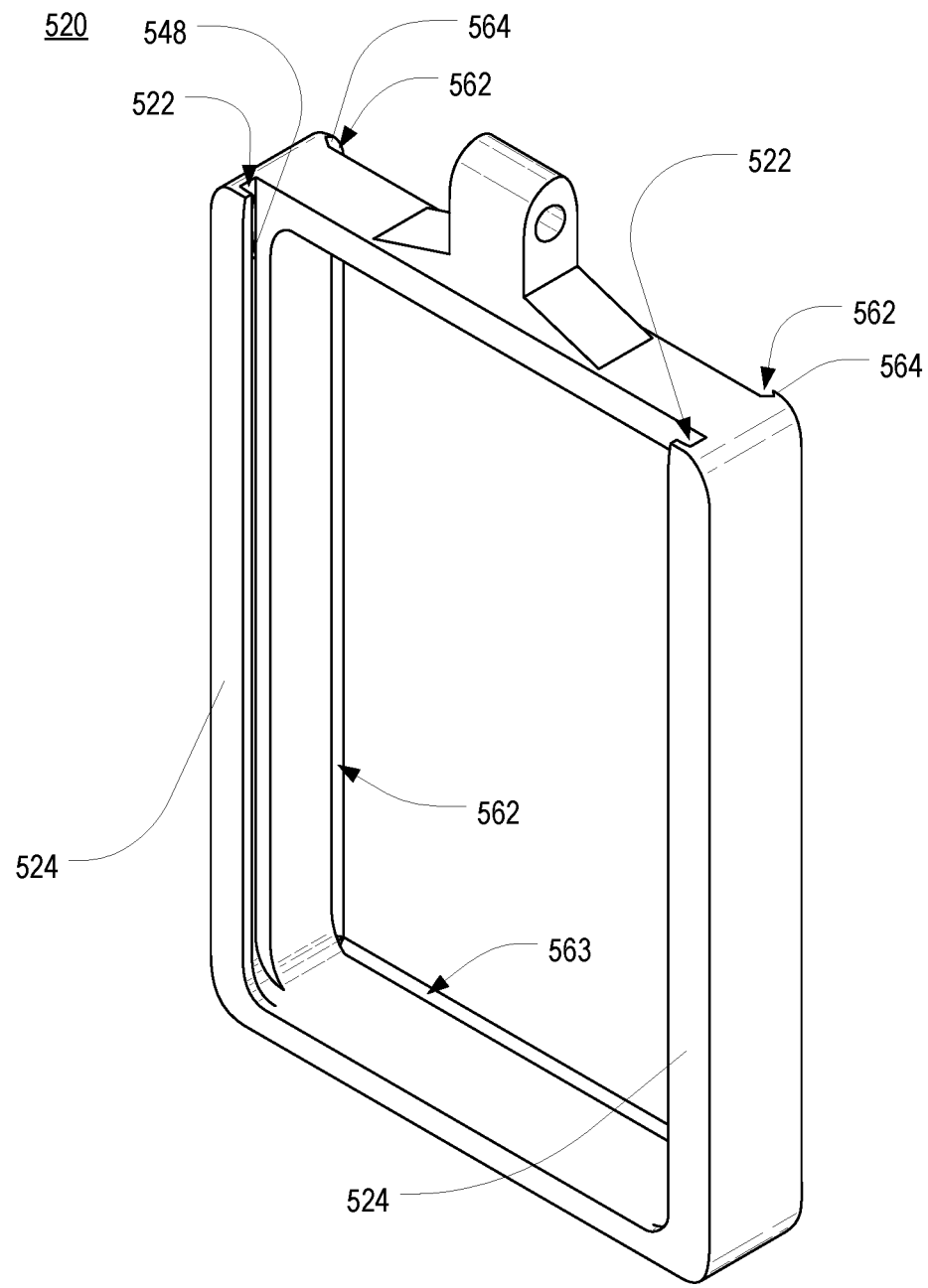
FIG. 30 is a front orthogonal view of the primary housing of the case of FIG. 29.

FIG. 30 is a front orthogonal view of the primary housing 520 of the case 510 of FIG. 29. The primary housing 520 includes two pairs of opposed receiving channels 522,562. Each front receiving channel 522 is defined at an inside of a respective widthwise, horizontal side of the front of the primary housing 520. The front receiving channels 522 are partially defined by sides of the primary housing 520 and partially defined by protruding edges 524 of a front of the primary housing 520. Each rear receiving channel 562 is defined at an inside of a respective widthwise, horizontal side of the rear of the primary housing 520. The rear receiving channels 562 are partially defined by sides of the primary housing 520 and partially defined by protruding edges 564 of a rear of the primary housing 520. Preferably, the channels 522,562 extend lengthwise, vertically along the interior sides of the primary housing 520 through a top of the primary housing 520, such that a top opening of each channel 522,562 is defined in the top of the primary housing 520. Some channels 522 do not extend into or through a bottom surface of the primary housing 520; instead, a bottom of each channel 522 is flush with an interior surface of a bottom of the primary housing 520. In other embodiments, the channels extend to the bottom surface of the primary housing but there is no channel along the bottom. Preferably, there is no channel defined in the front of the bottom surface of the primary housing 520, thereby making it easier to extract ID cards 102 or the like from the case 510. In some embodiments, a channel 563 is provided along the bottom of the primary housing 520.

It will also be appreciated that receiving channels or other interfaces may be defined in other ways. For example, channels may be arranged in the cover with corresponding structures arranged in the primary housing.

Figure 31:
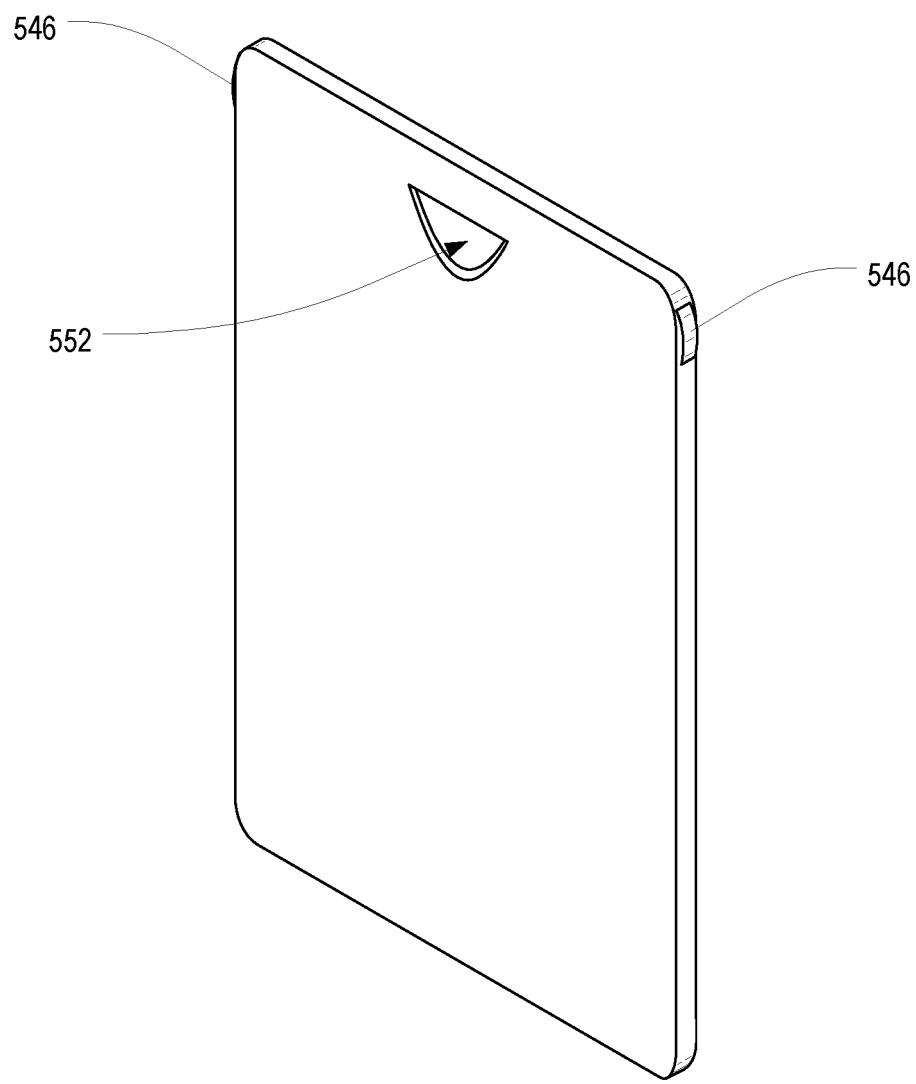
FIG. 31 is a front orthogonal view of the reversible cover of the case of FIG. 29.

FIG. 31 is a front orthogonal view of the reversible cover 540 of the case of FIG. 29. As shown therein, a securement opening 552 is provided for use in separately securing the case 540 to a lanyard 11 or clip. Otherwise, the front is generally featureless, while the rear includes functional features such as those described with respect to FIGS. 6-8. However, in various embodiments, decorative or functional features may be added to the front. The cover 540 also includes a pair of additional nubs 546 are disposed at upper ends of the widthwise sides of the cover 540. In at least some embodiments, these nubs 546 couple with corresponding recesses at the tops of the side channels 522 of the primary housing 520 (one of which is visible in FIG. 30). Such an arrangement helps ensure that the cover 540 does not slide out inadvertently. It will be appreciated that such a feature may likewise be provided on the cover 40 described previously.

Figure 32:
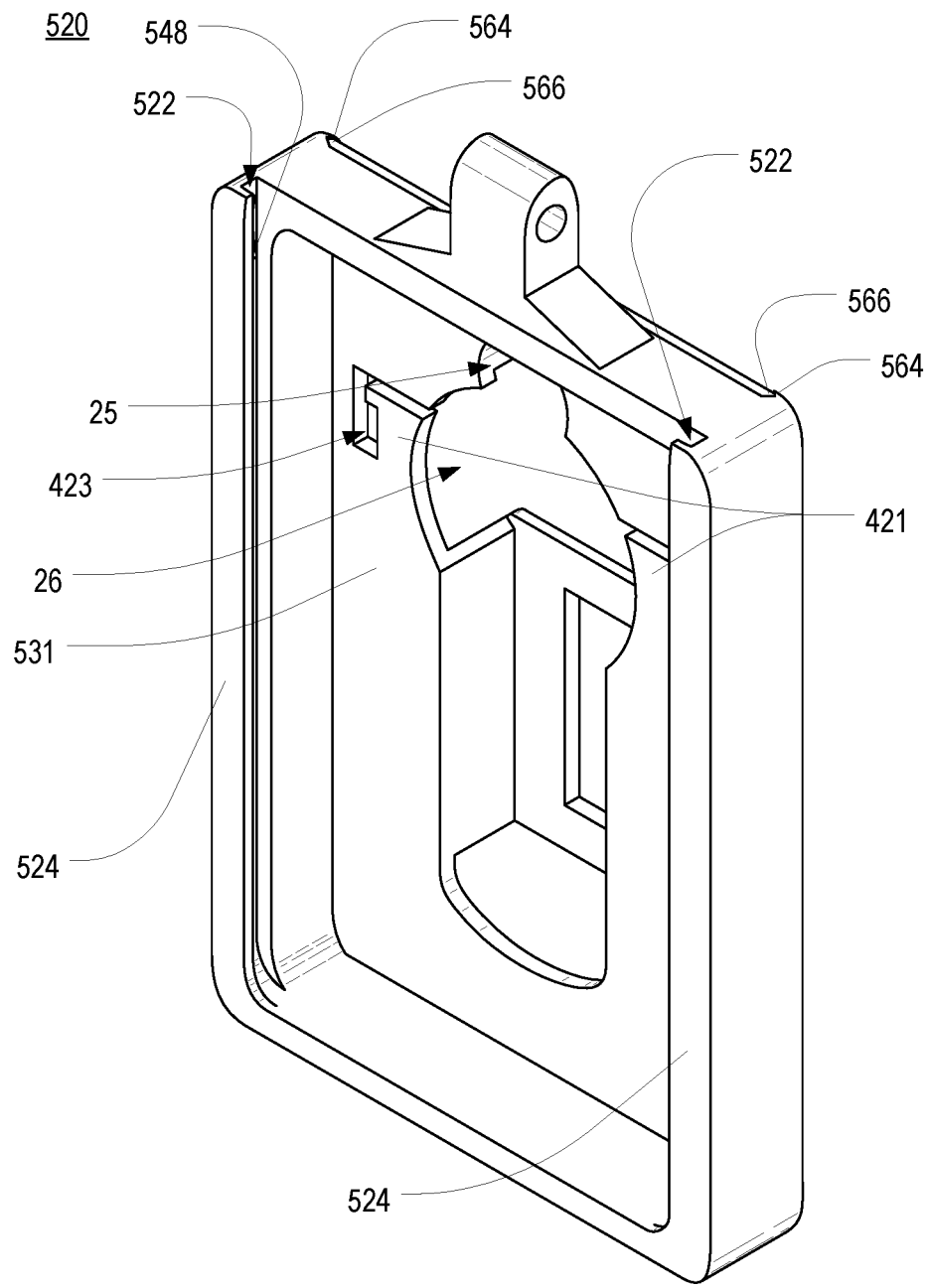
FIG. 32 is a front orthogonal view of the primary housing of FIG. 30, shown with a security token rear panel installed therein.
Figure 33:
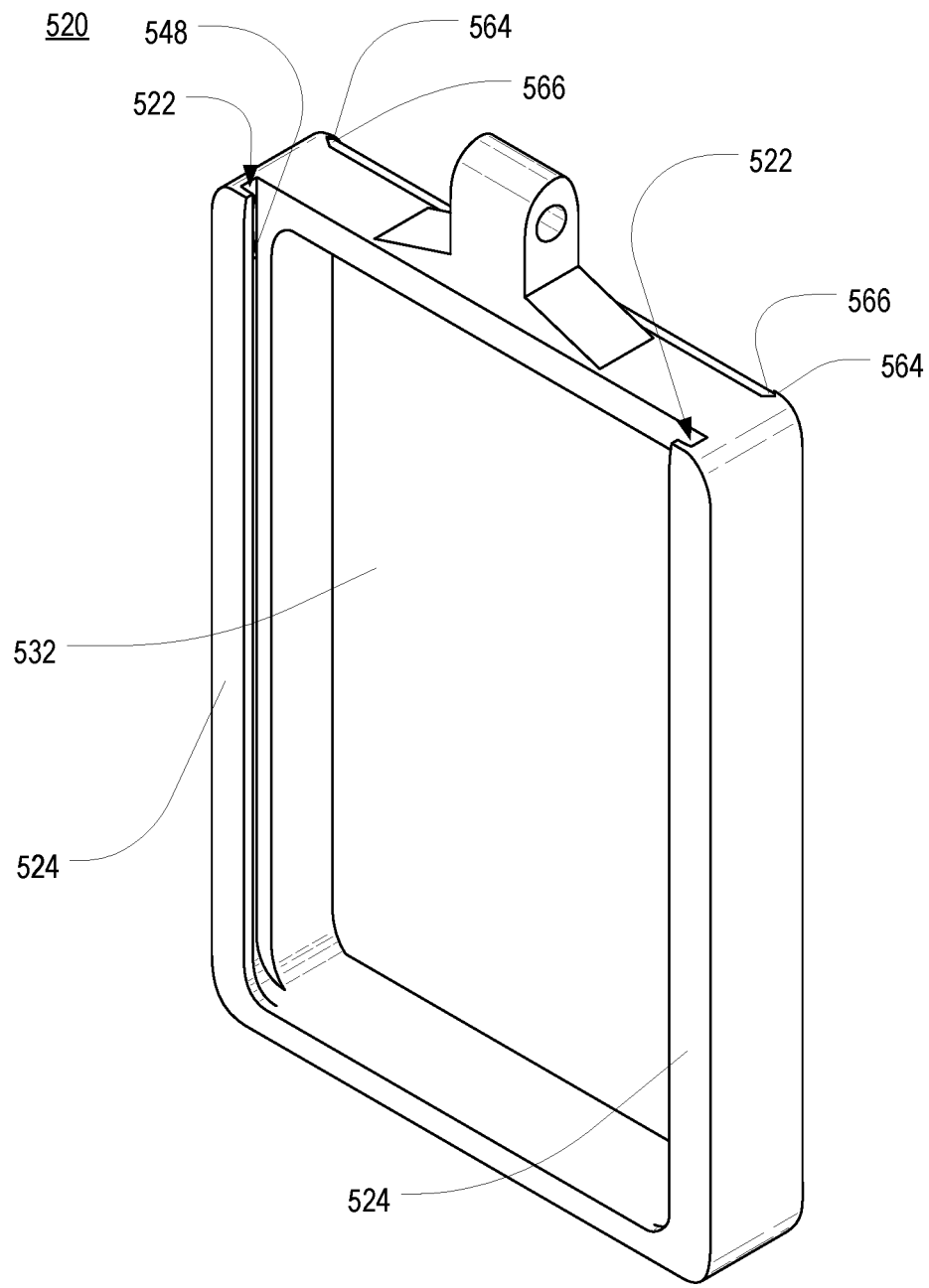
FIG. 33 is a front orthogonal view of the primary housing of FIG. 30, shown with a plain rear panel installed therein.
Figure 34:
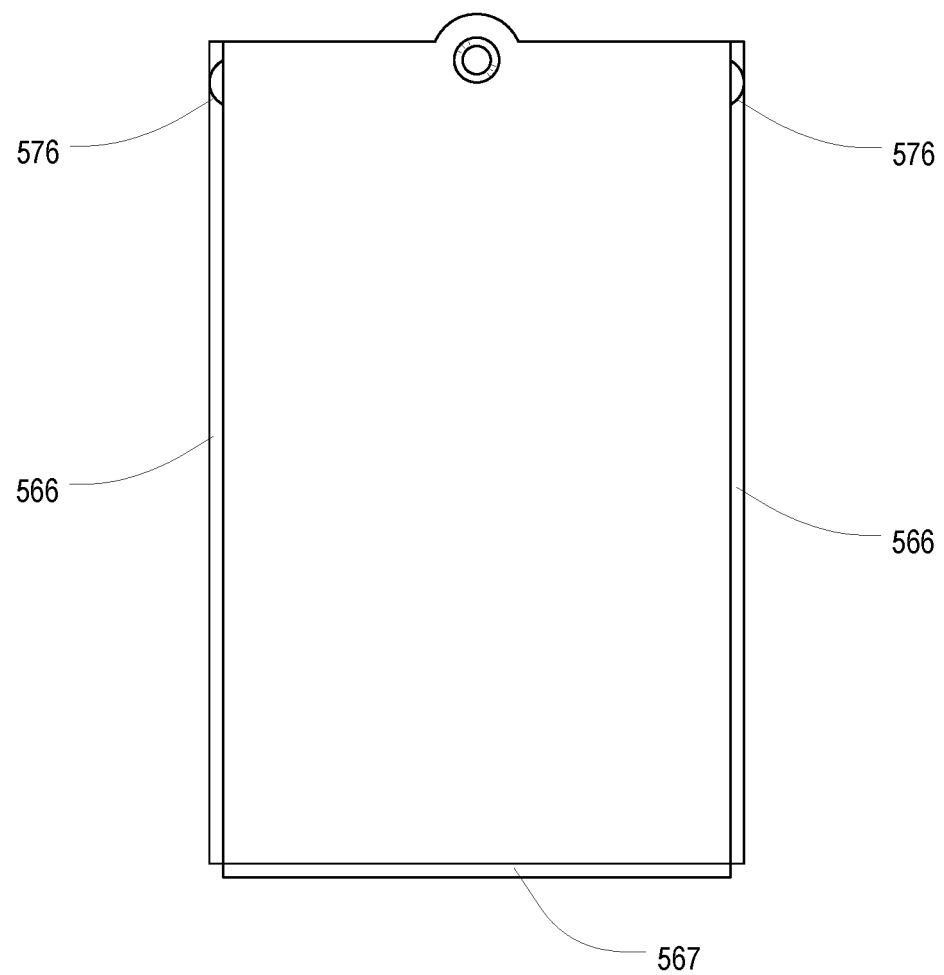
FIG. 34 is a rear plan view of the plain rear panel of FIG. 33, showing the beveled edges thereof.

The case 510 of FIG. 29 includes a removable and replaceable rear panel. This feature may be particularly useful for switching between a rear panel 531 that retains a security token 105 and a plain rear panel 532. In this regard, FIG. 32 is a front orthogonal view of the primary housing 520 of FIG. 30, shown with a security token rear panel 531 installed therein; and FIG. 33 is a front orthogonal view of the primary housing 520 of FIG. 30, shown with a plain rear panel 532 installed therein. Other than being removable, the security token rear panel 531 may be similar in construction to the rear panel of the primary housing 420 of FIG. 26. Each rear panel 531,532 includes beveled edges 566,567 that fit neatly into the rear receiving channels 562,563. In this regard, FIG. 34 is a rear plan view of the plain rear panel 532 of FIG. 33, showing the beveled edges 566,567 thereof. Each rear panel 531,532 also includes a pair of additional nubs 576 are disposed at upper ends of the widthwise sides of the rear panel 531,532. In at least some embodiments, these nubs 576 couple with corresponding recesses (not shown) at the tops of the rear side channels 532 of the primary housing 520. Such an arrangement helps ensure that the rear panel 531,532 does not slide out inadvertently.

In accordance with one or more preferred implementations, a case is made of plastic. In accordance with one or more preferred implementations, a case comprises nylon (polyamide), acrylic, polycarbonate, polyoxymethylene (POM), polystyrene (PS), acrylonitrile butadiene styrene (ABS), polypropylene (PP), polyethylene (PE), high-density polyethylene (HDPE). In accordance with one or more preferred implementations, a case comprises a plastic composite.

A method of manufacturing a case in accordance with one or more preferred implementations comprises injection molding the primary housing and injection molding the reversible cover. A method of manufacturing a case in accordance with one or more preferred implementations comprises 3D printing the primary housing and 3D printing the reversible cover. A method of manufacturing a case in accordance with one or more preferred implementations comprises vacuum casting the primary housing and vacuum casting the reversible cover.

The cases described herein, including the reversible cover 40 in combination with any of the various primary housings 20,120,220,320,420, advantageously provide improved operational security by giving users the ability to mount an ID card 101 in the reversible cover 40, as described herein, and then to quickly and easily adjust from a card display state to a card conceal state, and back again, without remounting the ID card 101. This provides a convenient means for a user to display the ID card 101 when needed, hide it when not in use, and keep the ID card 101 in a single case in both situations. Further ID cards 102 or other items may likewise be stored in the cases. In addition, in some of the cases described herein, including the reversible cover 40 in combination with the primary housings 20,120,420 of FIGS. 3, 20, and 26, advantageously provide improved operational security by giving users the ability to mount a key-shaped security token (fob) 105 in the respective housing 20,120,420, as described herein, and then to quickly and easily adjust from a security token screen display state to a security token screen conceal state, and back again, using the same housing 20,120,420.

Similarly, the reversible cover 540, replaceable rear panel 531,532, and primary housing 520 advantageously provides improved operational security by giving users the ability to mount an ID card 101 in the reversible cover 540 and then to quickly and easily adjust from a card display state to a card conceal state, and back again, without remounting the ID card 101. This provides a convenient means for a user to display the ID card 101 when needed, hide it when not in use, and keep the ID card 101 in a single case in both situations. Further ID cards 102 or other items may likewise be stored in the case 510. In addition, when the security token rear panel 531 is utilized, the case 510 advantageously provides improved operational security by giving users the ability to mount a key-shaped security token (fob) 105 in the rear panel 531 and then to quickly and easily adjust from a security token screen display state to a security token screen conceal state, and back again, using the same rear panel 531, as well as to adjust from a security token rear panel 531 to a plain rear panel 532, and back again, using the same case and cover 540.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A method of manufacturing a case for holding one or more identification cards and a security token, the method comprising:
   (a) injection molding a primary housing comprising
      (i) two opposed receiving channels disposed on a first depthwise side of the primary housing, the opposed receiving channels extending lengthwise along widthwise sides of the primary housing, each receiving channel extending along an interior of a respective widthwise side through a top of the primary housing such that a top opening of each receiving channel is defined in the top of the primary housing, a bottom of each receiving channel being flush with an interior surface of a bottom of the primary housing,
      (ii) a cutout opening sized and dimensioned for insertion of a security token,
      (iii) an inset frame protruding on a second depthwise side of the primary housing opposite the first depthwise side, the inset frame being sized and dimensioned to receive and hold a portion of a security token inserted through the cutout opening, the inset frame including a view cutout sized, dimensioned, and positioned to correspond to a display screen of a security token when such a security token is received in the inset frame;
   (b) injection molding a reversible cover sized and dimensioned to be removably received within the primary housing with widthwise sides of the reversible cover received within the opposed receiving channels of the primary housing, the reversible cover comprising
      (i) a first depthwise side including retention members configured to retain an installed identification card for display, and
      (ii) a second depthwise side opposite the first depthwise side;
   (c) wherein the case is configured to enable
      (i) installation of an identification card in the reversible cover on the first depthwise side with retention by the retention members,
      (ii) installation of the reversible cover in the primary housing in
         (A) a card display state in which the first depthwise side of the reversible cover is aligned with the first depthwise side of the primary housing such that an identification card installed in the primary housing is visible from an exterior of the case, and
         (B) a card conceal state in which the second depthwise side of the reversible cover is aligned with the first depthwise side of the primary housing such that an identification card installed in the primary housing is not visible from an exterior of the case,
      (iii) storage of a plurality of cards behind the reversible cover when the reversible cover is installed in the primary housing,
      (iv) installation of a security token within the primary housing in
         (A) a screen display state in which a display screen of such installed security token is visible through the view cutout of the inset frame, and
         (B) a screen conceal state in which a display screen of such installed security token is not visible through the view cutout of the inset frame.

2. The method of claim 1, wherein at least one of the primary housing and the reversible cover comprises high-density polyethylene.

3. The method of claim 1, wherein at least one of the primary housing and the reversible cover comprises polypropylene.

4. The method of claim 1, wherein at least one of the primary housing and the reversible cover comprises a plastic composite.

5. The method of claim 1, wherein at least one of the primary housing and the reversible cover comprises polycarbonate.

6. The method of claim 1, wherein at least one of the primary housing and the reversible cover comprises acrylic.

7. A method of manufacturing a case for holding one or more identification cards and a security token, the method comprising:
   (a) 3D printing a primary housing comprising
      (i) two opposed receiving channels disposed on a first depthwise side of the primary housing, the opposed receiving channels extending lengthwise along widthwise sides of the primary housing, each receiving channel extending along an interior of a respective widthwise side through a top of the primary housing such that a top opening of each receiving channel is defined in the top of the primary housing, a bottom of each receiving channel being flush with an interior surface of a bottom of the primary housing, (ii) a cutout opening sized and dimensioned for insertion of a security token, (iii) an inset frame protruding on a second depthwise side of the primary housing opposite the first depthwise side, the inset frame being sized and dimensioned to receive and hold a portion of a security token inserted through the cutout opening, the inset frame including a view cutout sized, dimensioned, and positioned to correspond to a display screen of a security token when such a security token is received in the inset frame;

(b) 3D printing a reversible cover sized and dimensioned to be removably received within the primary housing with widthwise sides of the reversible cover received within the opposed receiving channels of the primary housing, the reversible cover comprising (i) a first depthwise side including retention members configured to retain an installed identification card for display, and (ii) a second depthwise side opposite the first depthwise side;

(c) wherein the case is configured to enable (i) installation of an identification card in the reversible cover on the first depthwise side with retention by the retention members, (ii) installation of the reversible cover in the primary housing in (A) a card display state in which the first depthwise side of the reversible cover is aligned with the first depthwise side of the primary housing such that an identification card installed in the primary housing is visible from an exterior of the case, and (B) a card conceal state in which the second depthwise side of the reversible cover is aligned with the first depthwise side of the primary housing such that an identification card installed in the primary housing is not visible from an exterior of the case, (iii) storage of a plurality of cards behind the reversible cover when the reversible cover is installed in the primary housing, (iv) installation of a security token within the primary housing in (A) a screen display state in which a display screen of such installed security token is visible through the view cutout of the inset frame, and (B) a screen conceal state in which a display screen of such installed security token is not visible through the view cutout of the inset frame.

8. The method of claim 7, wherein at least one of the primary housing and the reversible cover comprises high-density polyethylene.

9. The method of claim 7, wherein at least one of the primary housing and the reversible cover comprises polypropylene.

10. The method of claim 7, wherein at least one of the primary housing and the reversible cover comprises a plastic composite.

11. The method of claim 7, wherein at least one of the primary housing and the reversible cover comprises polycarbonate.

12. The method of claim 7, wherein at least one of the primary housing and the reversible cover comprises acrylic.

13. A method of manufacturing a case for holding one or more identification cards and a security token, the method comprising:

(a) vacuum casting a primary housing comprising (i) two opposed receiving channels disposed on a first depthwise side of the primary housing, the opposed receiving channels extending lengthwise along widthwise sides of the primary housing, each receiving channel extending along an interior of a respective widthwise side through a top of the primary housing such that a top opening of each receiving channel is defined in the top of the primary housing, a bottom of each receiving channel being flush with an interior surface of a bottom of the primary housing, (ii) a cutout opening sized and dimensioned for insertion of a security token, (iii) an inset frame protruding on a second depthwise side of the primary housing opposite the first depthwise side, the inset frame being sized and dimensioned to receive and hold a portion of a security token inserted through the cutout opening, the inset frame including a view cutout sized, dimensioned, and positioned to correspond to a display screen of a security token when such a security token is received in the inset frame;

(b) vacuum casting a reversible cover sized and dimensioned to be removably received within the primary housing with widthwise sides of the reversible cover received within the opposed receiving channels of the primary housing, the reversible cover comprising (i) a first depthwise side including retention members configured to retain an installed identification card for display, and (ii) a second depthwise side opposite the first depthwise side;

(c) wherein the case is configured to enable (i) installation of an identification card in the reversible cover on the first depthwise side with retention by the retention members, (ii) installation of the reversible cover in the primary housing in (A) a card display state in which the first depthwise side of the reversible cover is aligned with the first depthwise side of the primary housing such that an identification card installed in the primary housing is visible from an exterior of the case, and (B) a card conceal state in which the second depthwise side of the reversible cover is aligned with the first depthwise side of the primary housing such that an identification card installed in the primary housing is not visible from an exterior of the case, (iii) storage of a plurality of cards behind the reversible cover when the reversible cover is installed in the primary housing, (iv) installation of a security token within the primary housing in (A) a screen display state in which a display screen of such installed security token is visible through the view cutout of the inset frame, and (B) a screen conceal state in which a display screen of such installed security token is not visible through the view cutout of the inset frame.

14. The method of 13, wherein at least one of the primary housing and the reversible cover comprises high-density polyethylene.

15. The method of 13, wherein at least one of the primary housing and the reversible cover comprises polypropylene.

16. The method of 13, wherein at least one of the primary housing and the reversible cover comprises a plastic composite.

17. The method of 13, wherein at least one of the primary housing and the reversible cover comprises polycarbonate.

18. The method of 13, wherein at least one of the primary housing and the reversible cover comprises acrylic.

* * * * *